No. 744,697. PATENTED NOV. 17, 1903.
C. STAHLBERG.
CALCULATING MACHINE.
APPLICATION FILED MAR. 31, 1902.
NO MODEL. 18 SHEETS—SHEET 7.
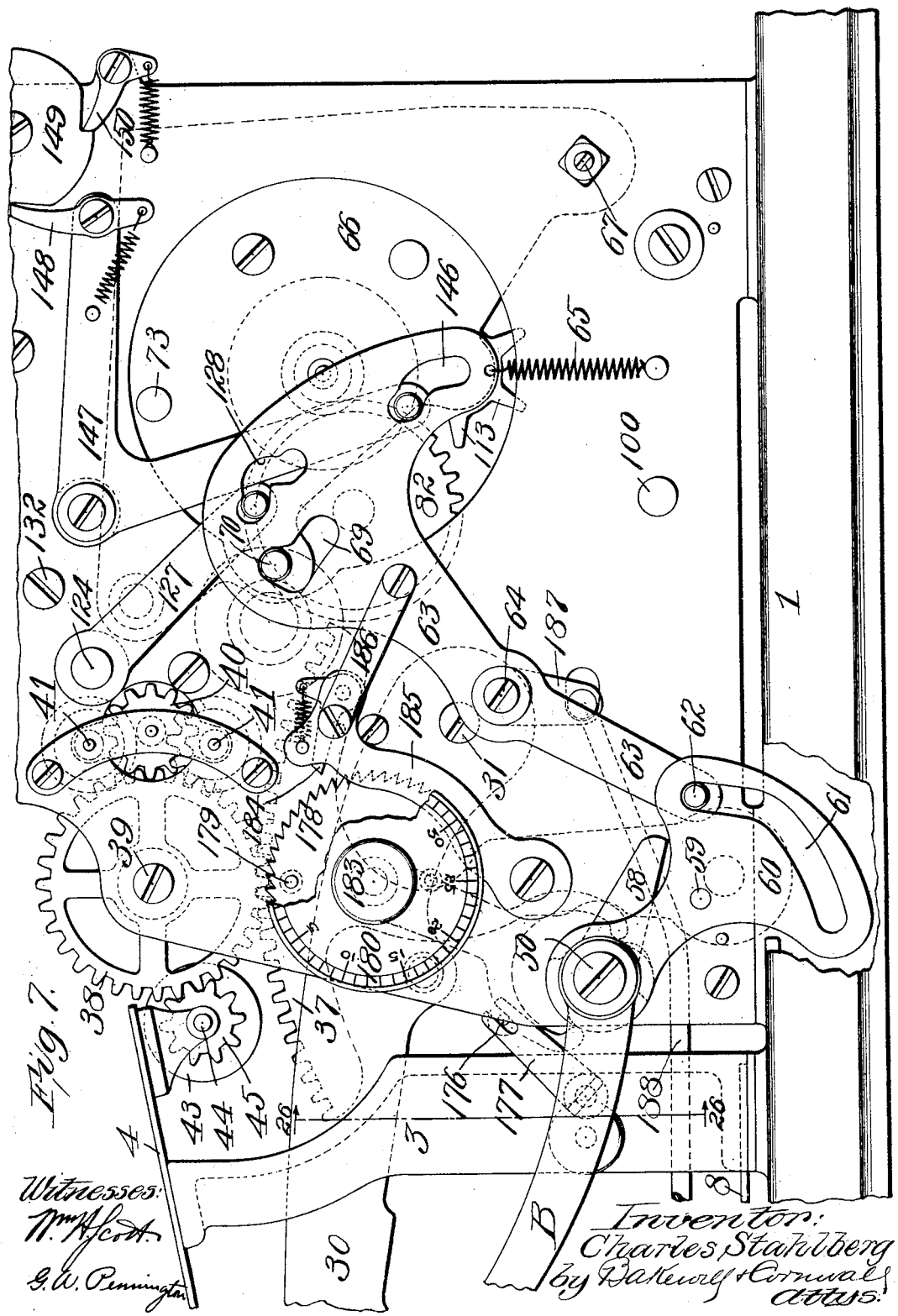

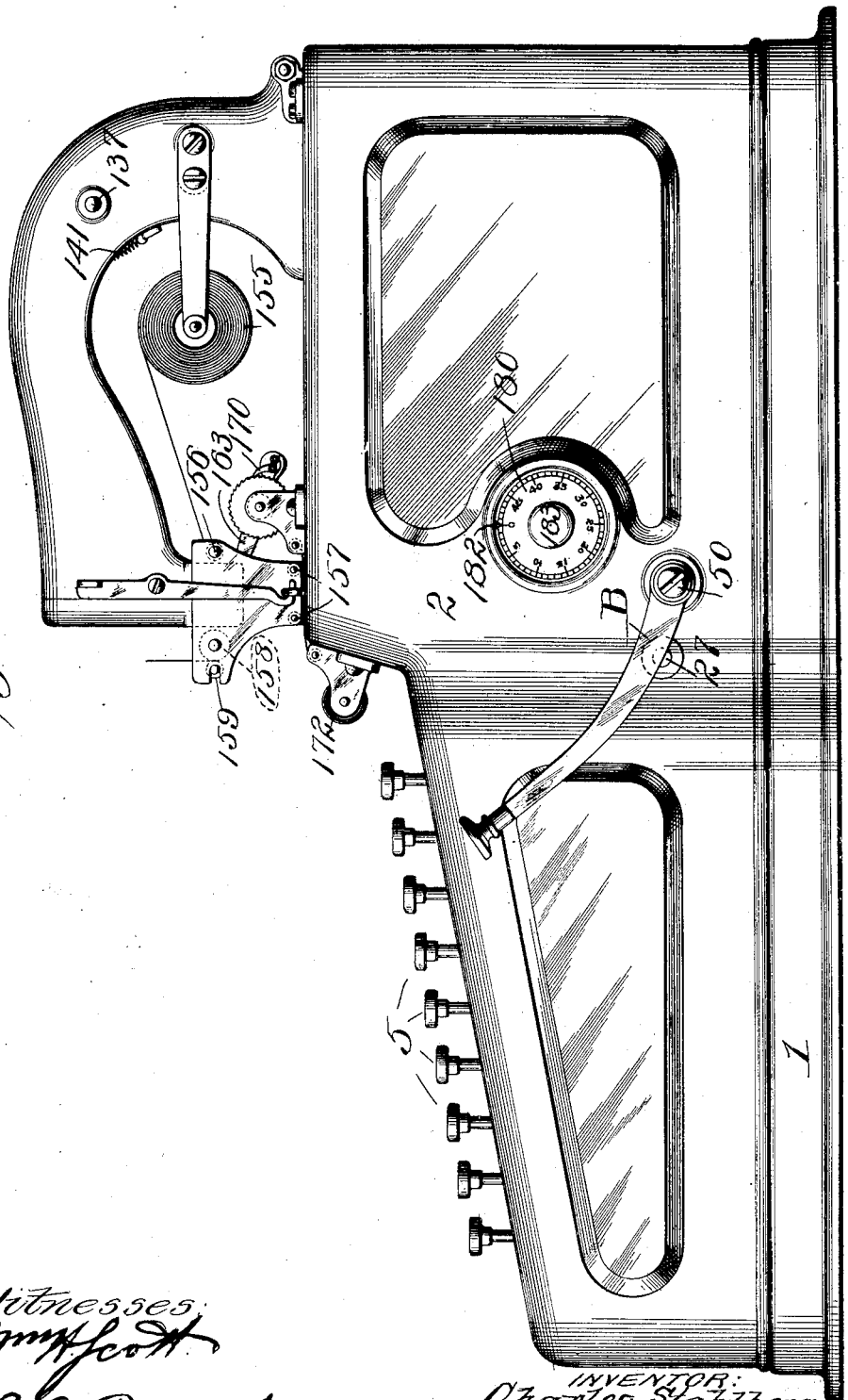

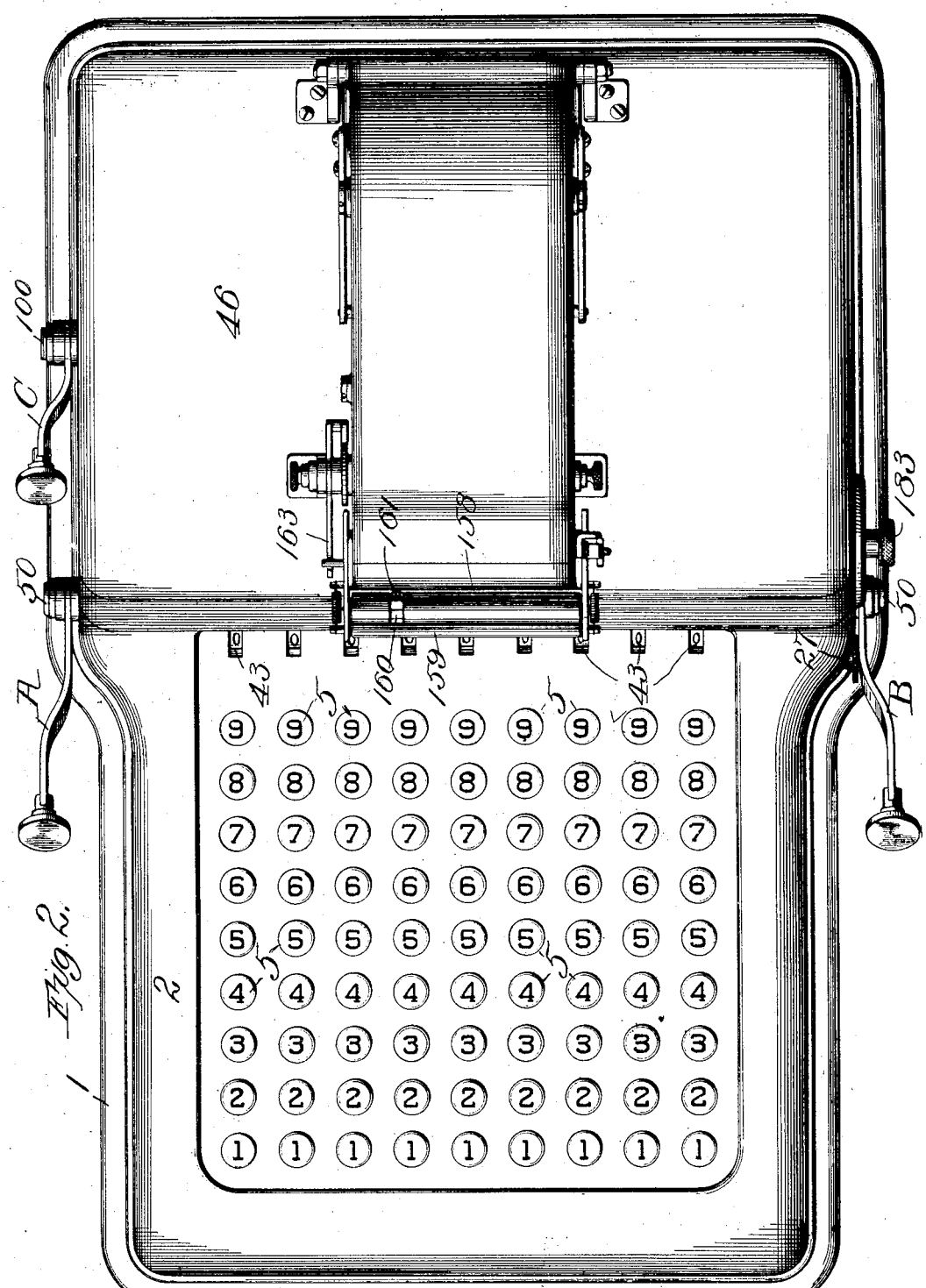

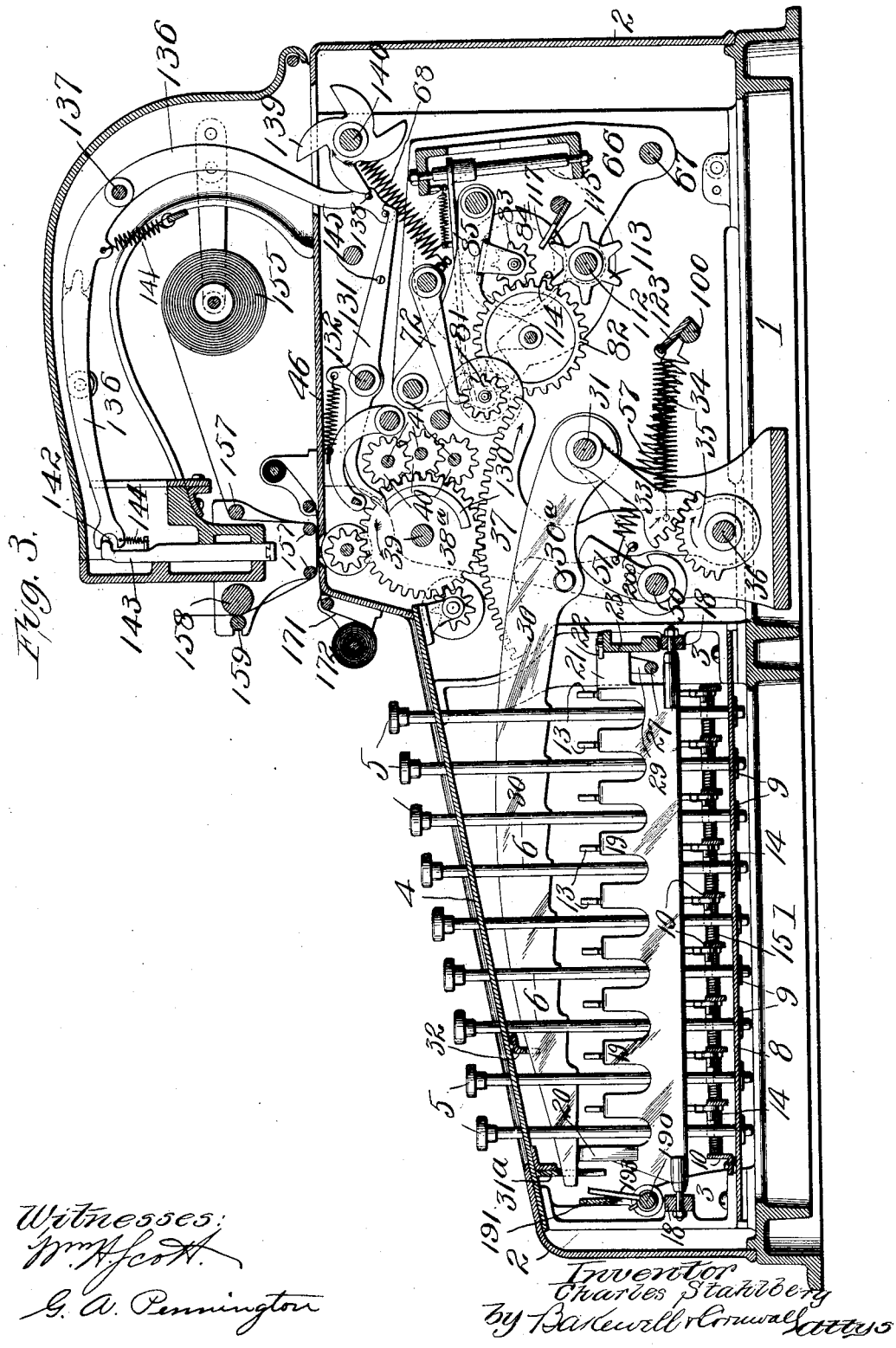

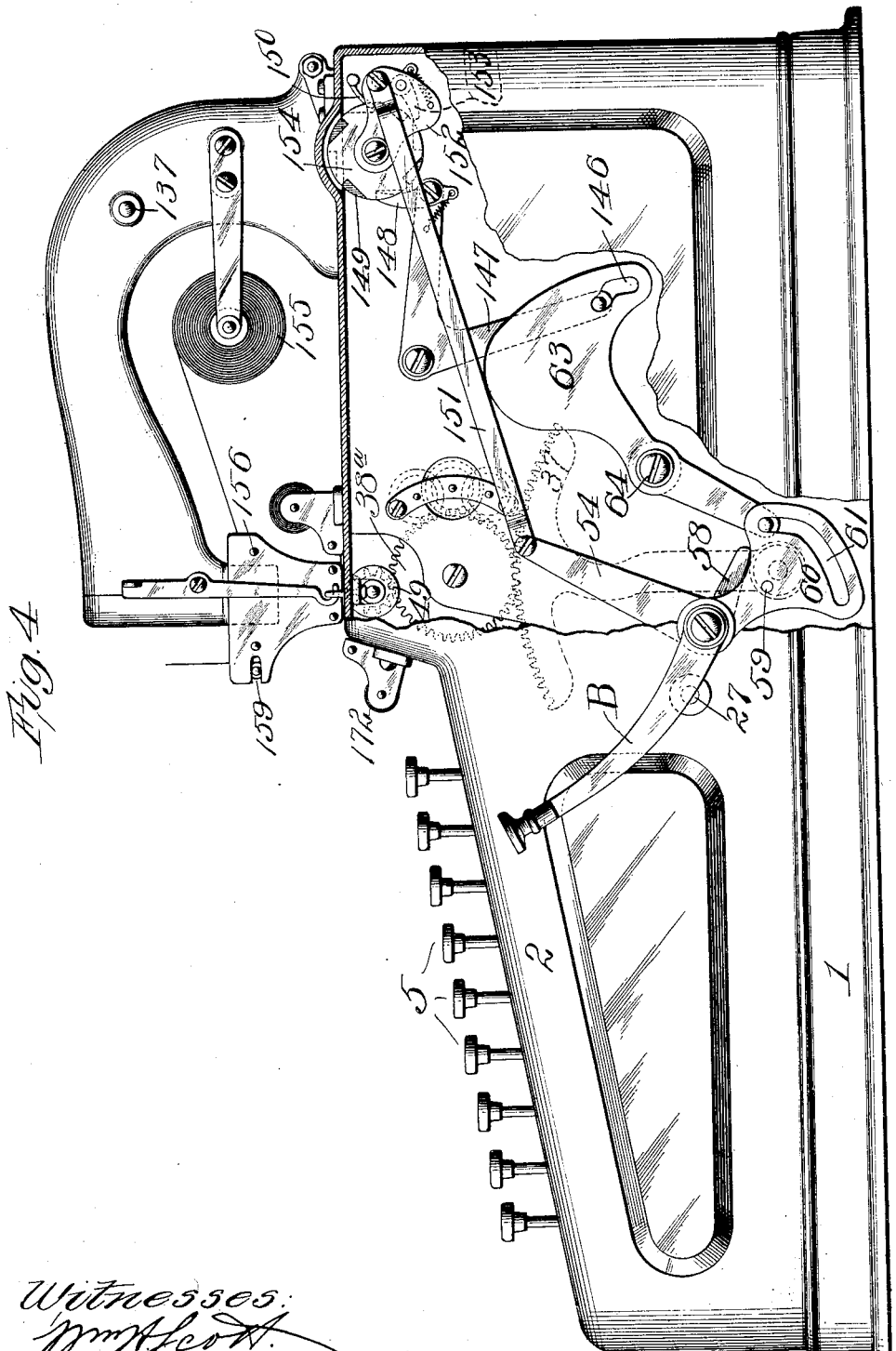

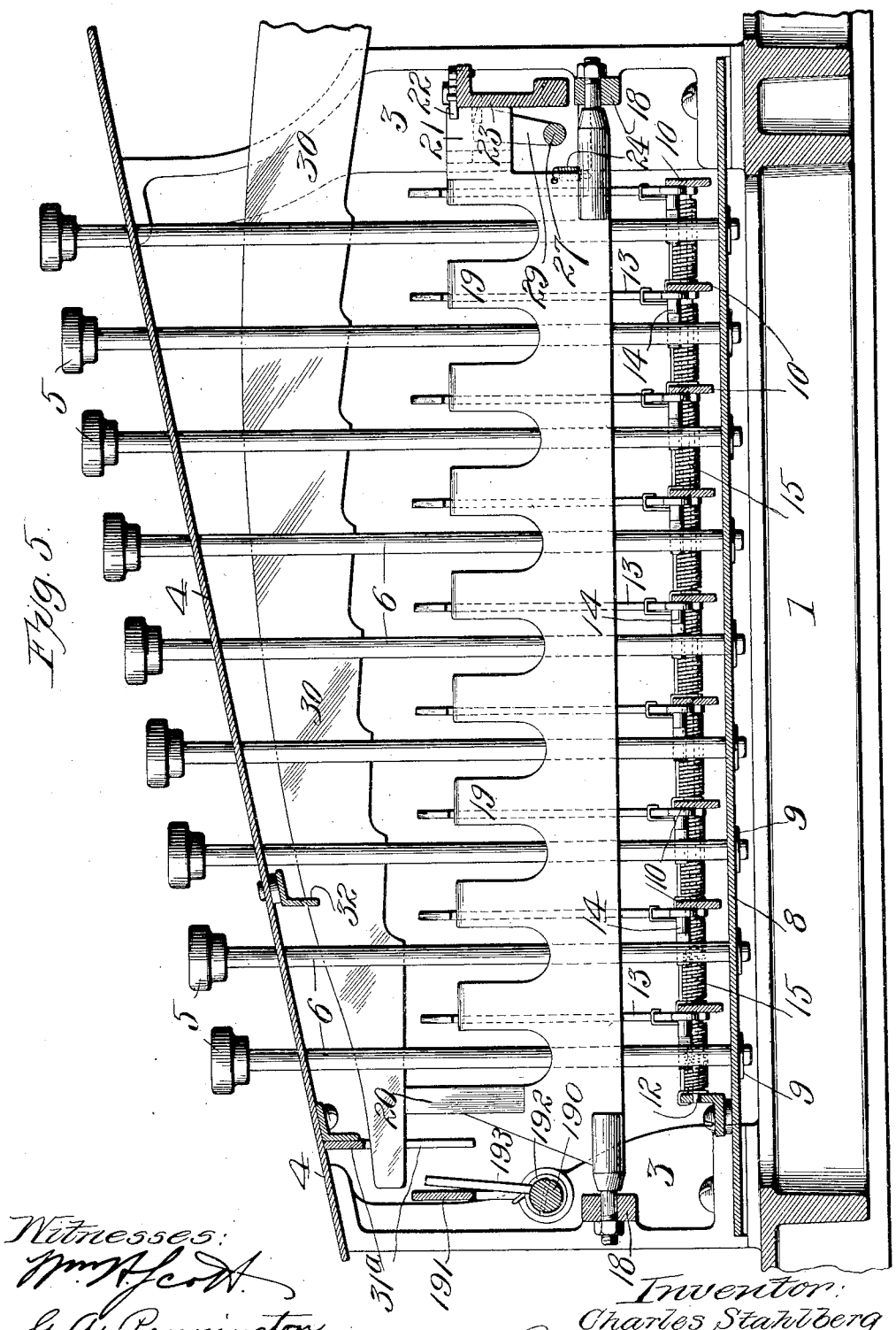

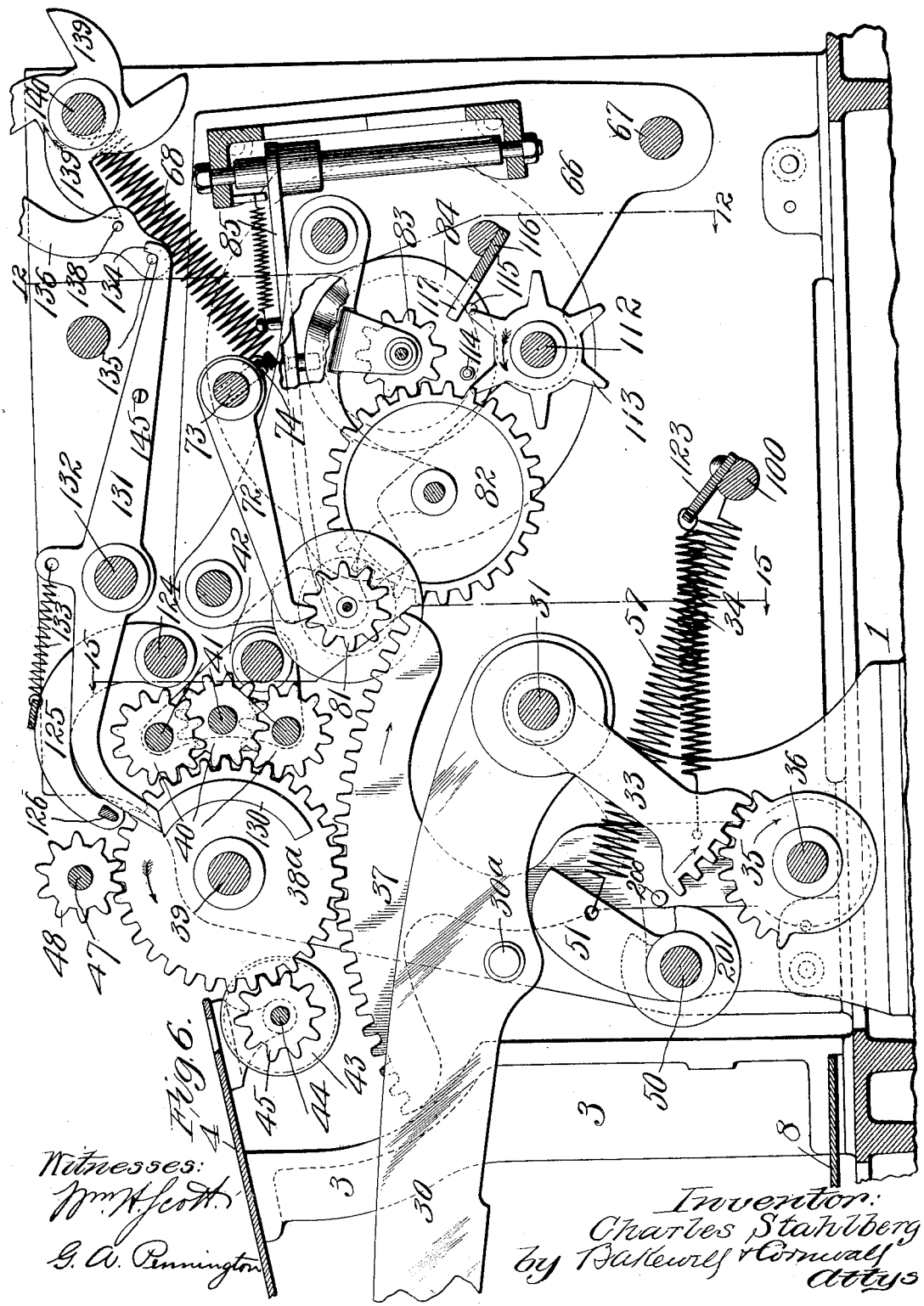

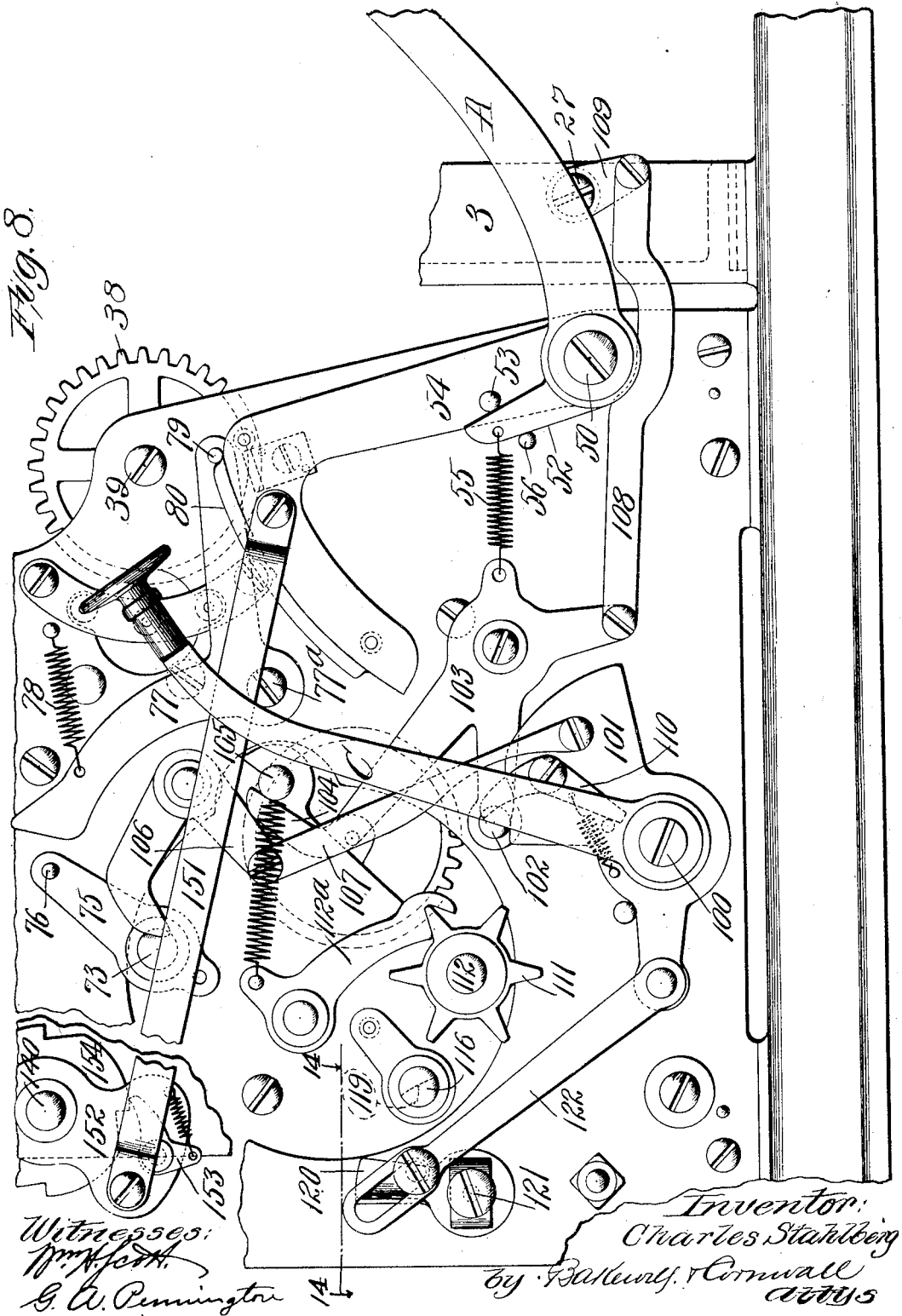

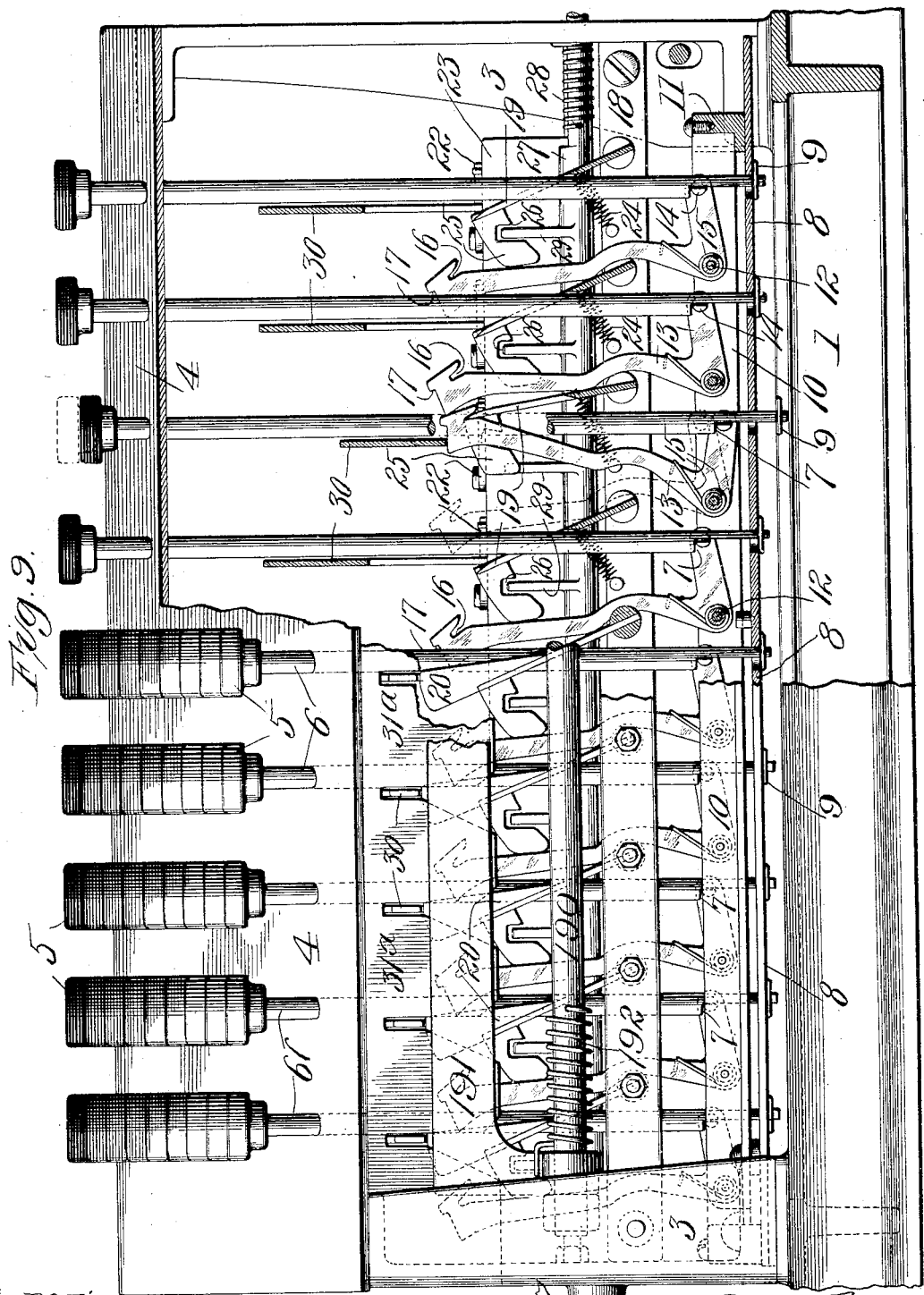

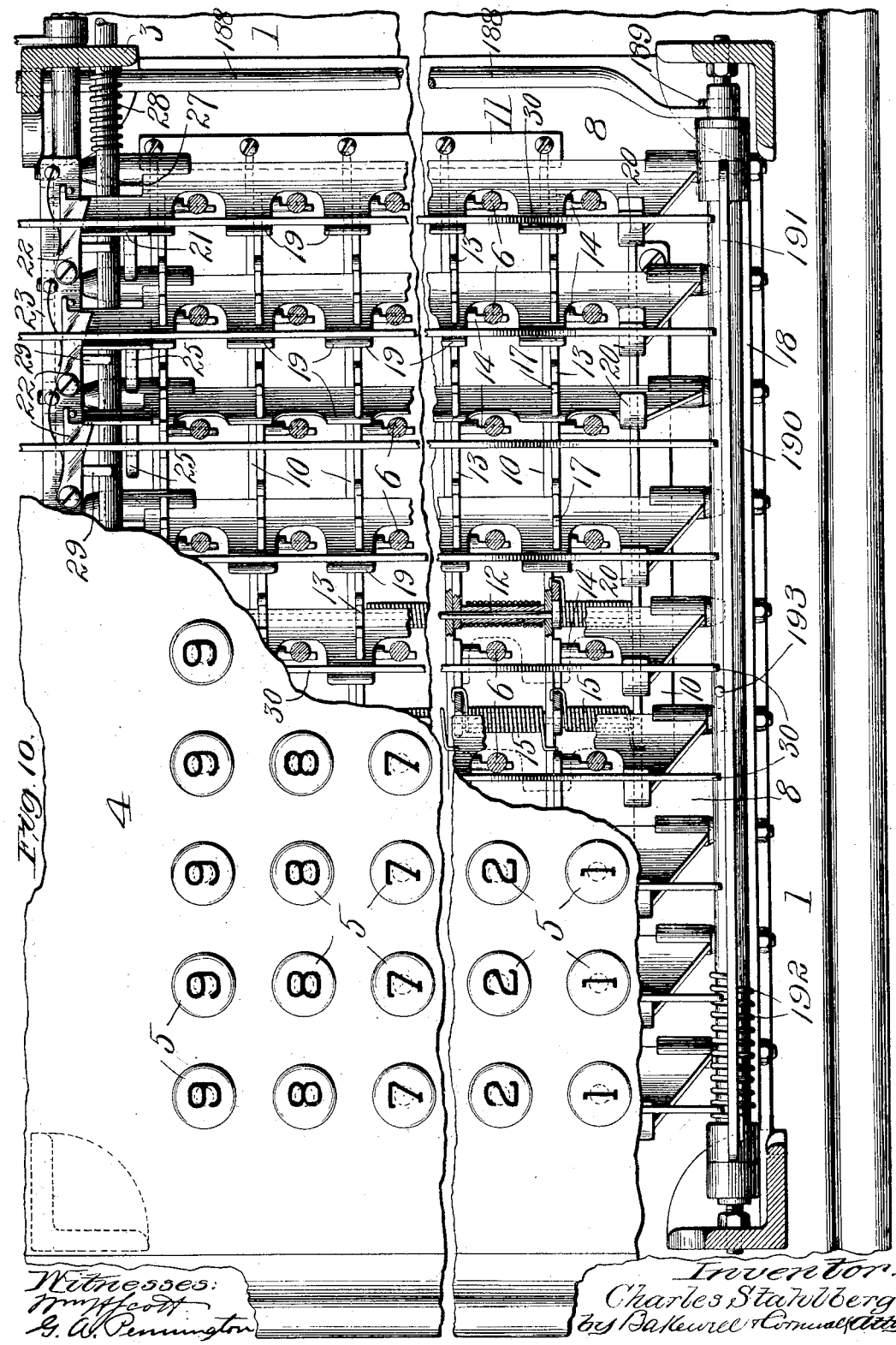

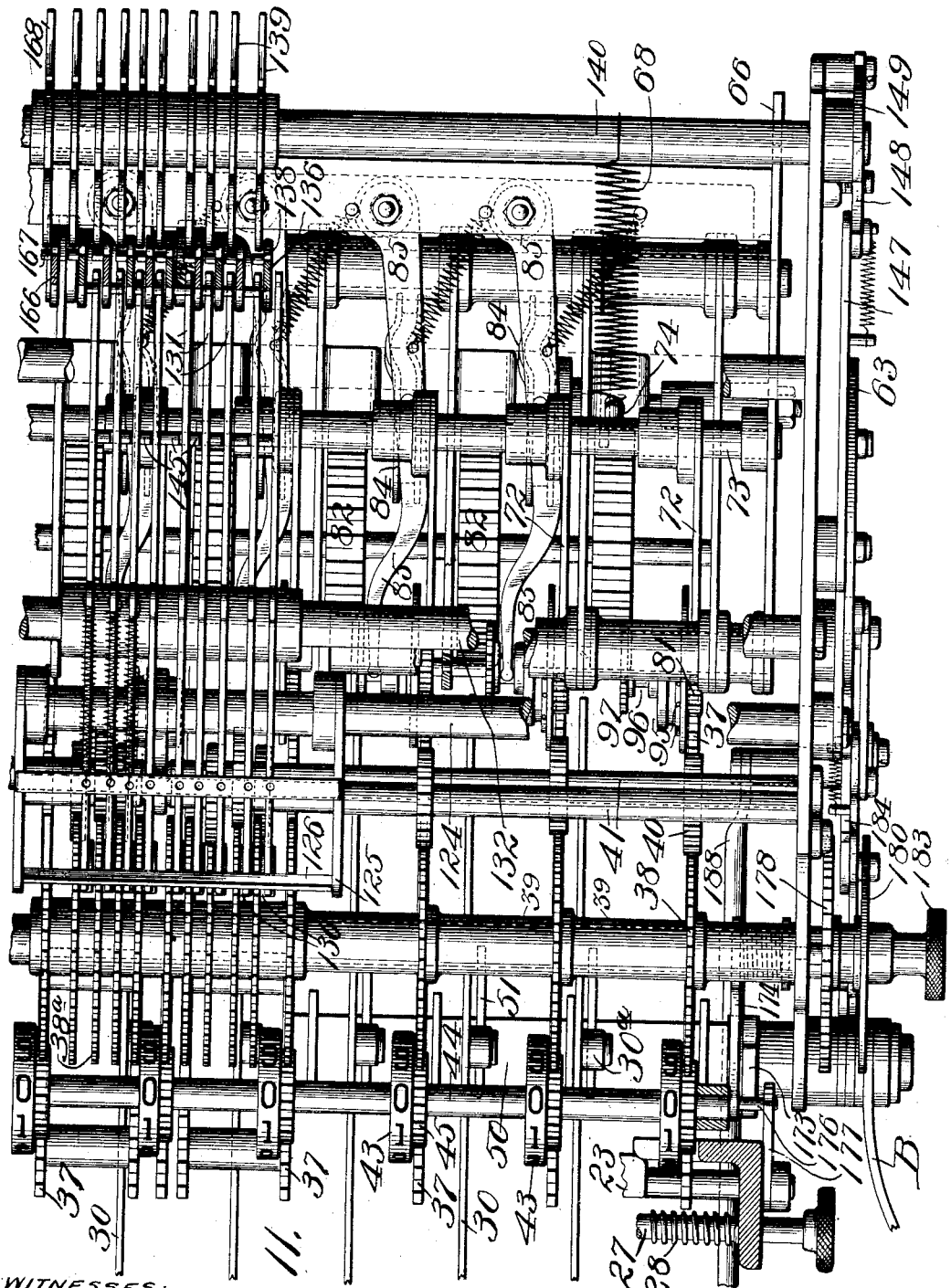

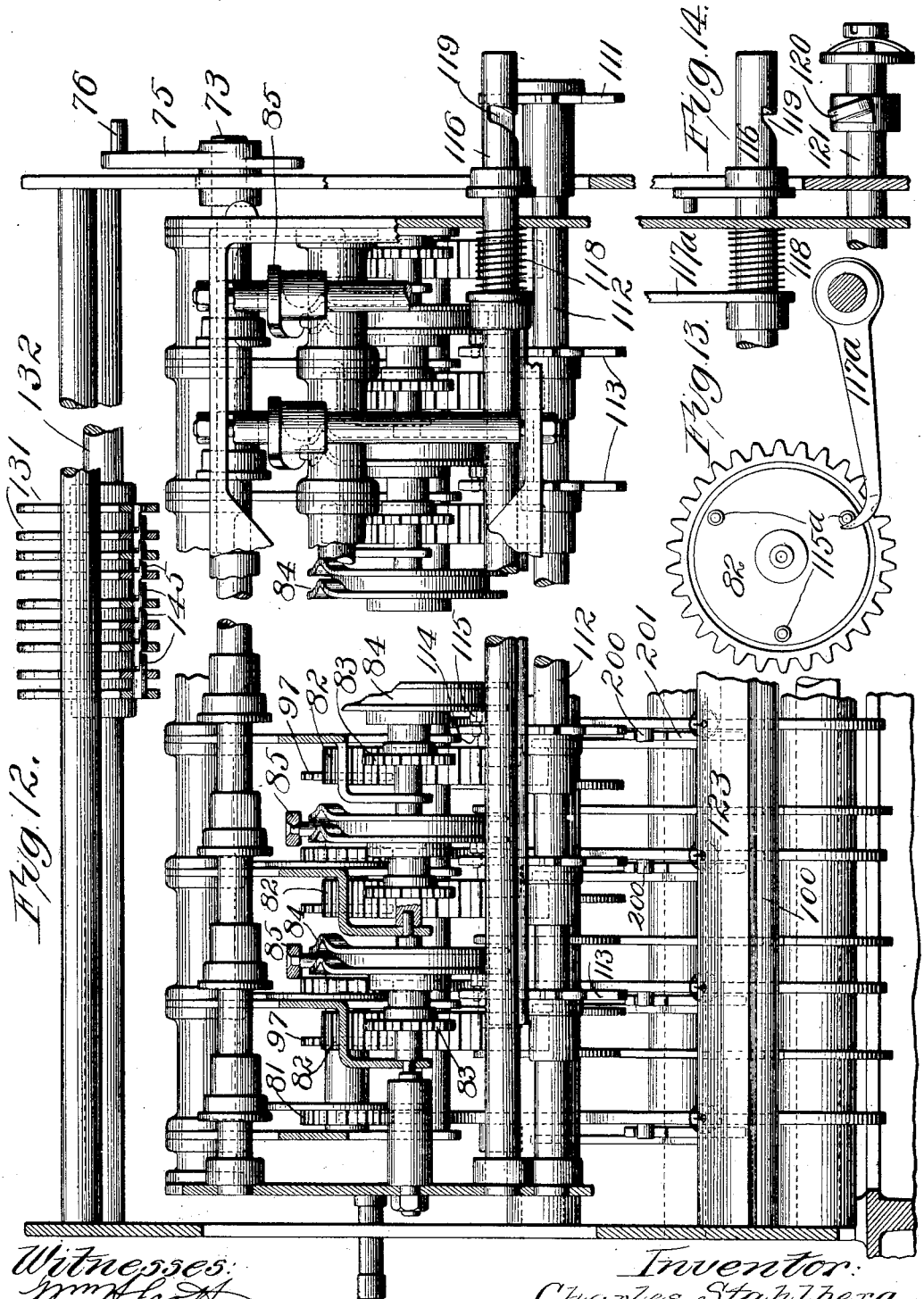

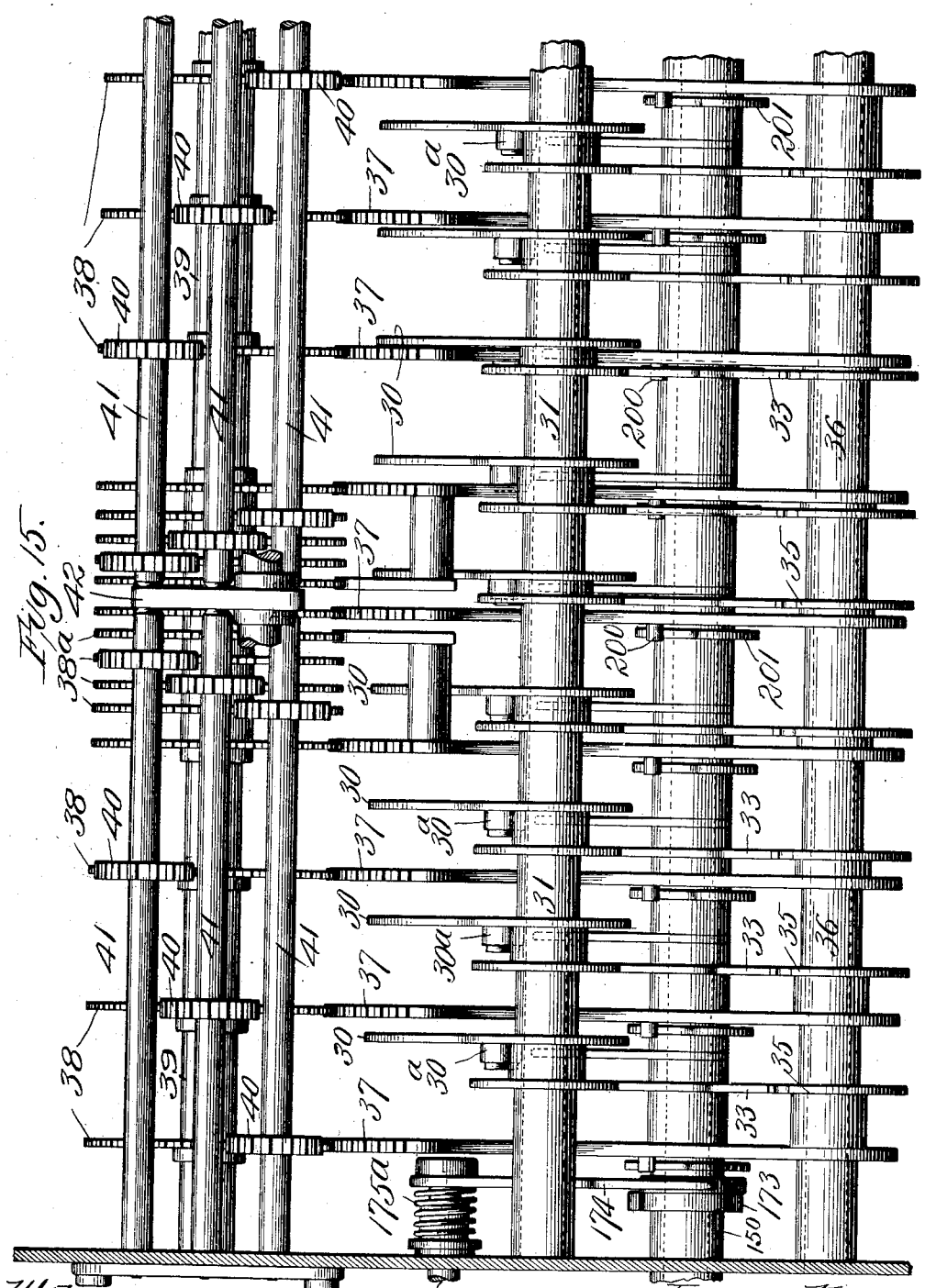

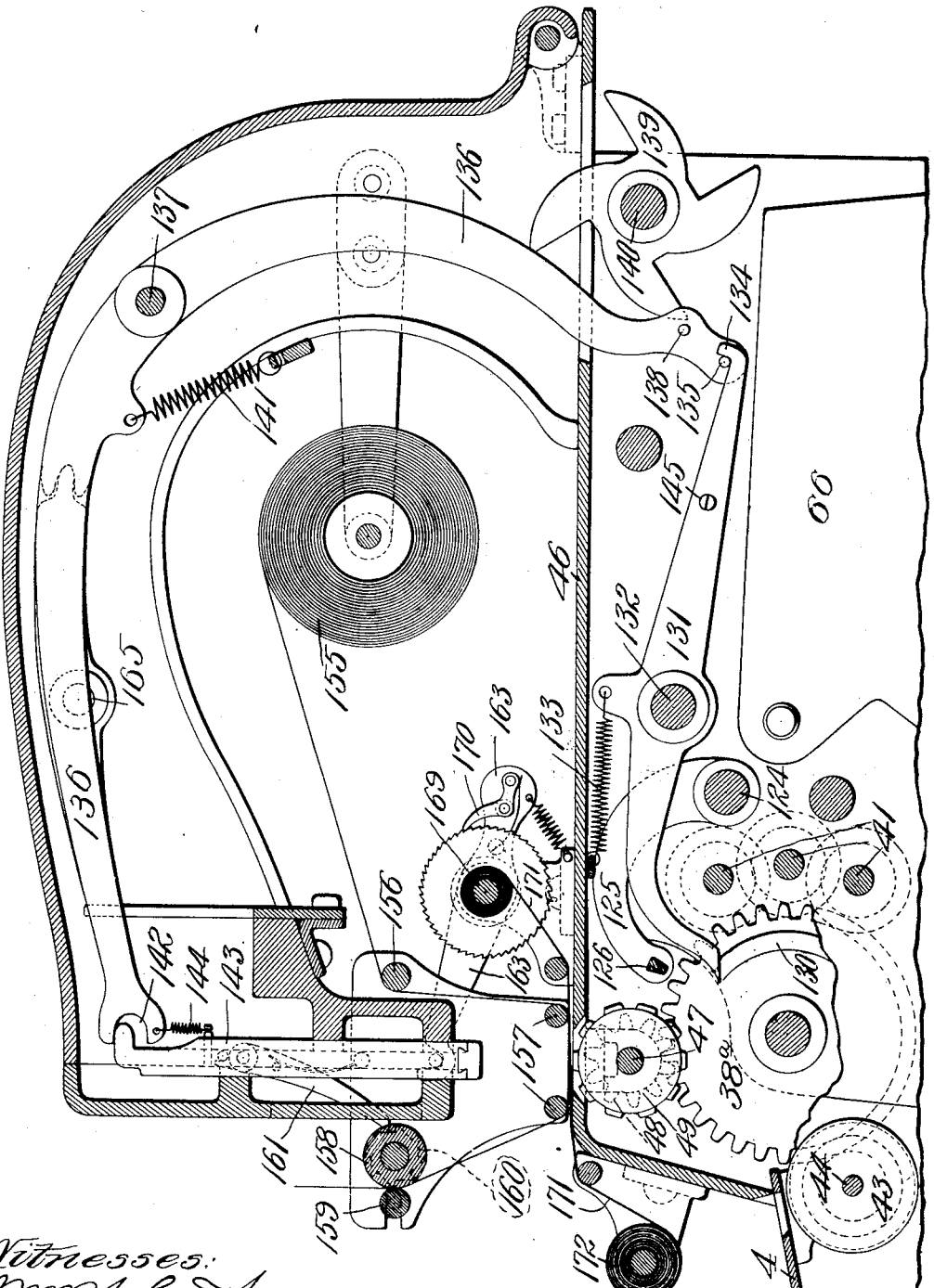

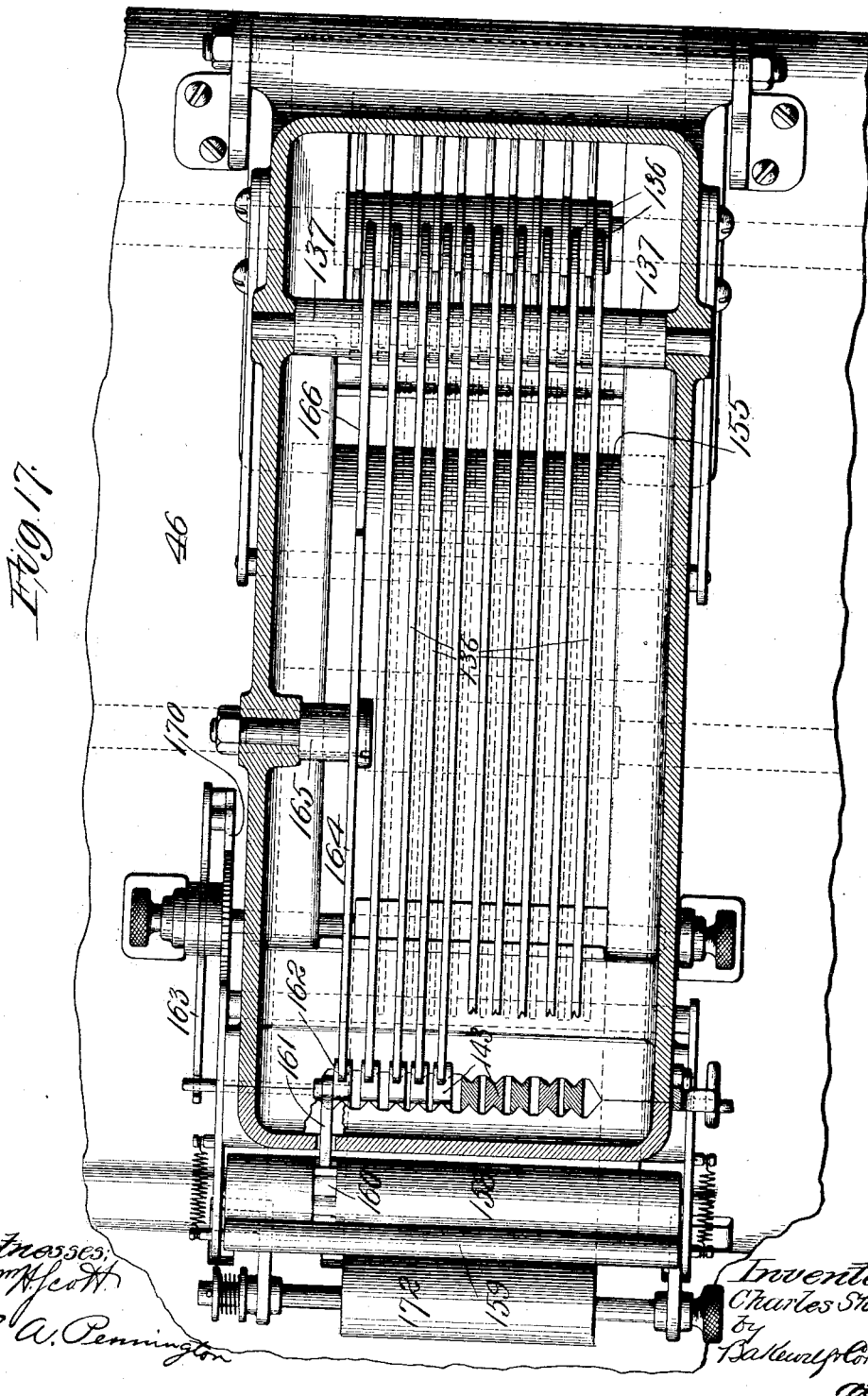

No. 744,697. PATENTED NOV. 17, 1903.
C. STAHLBERG.
CALCULATING MACHINE.
APPLICATION FILED MAR. 31, 1902.
NO MODEL. 18 SHEETS—SHEET 16.
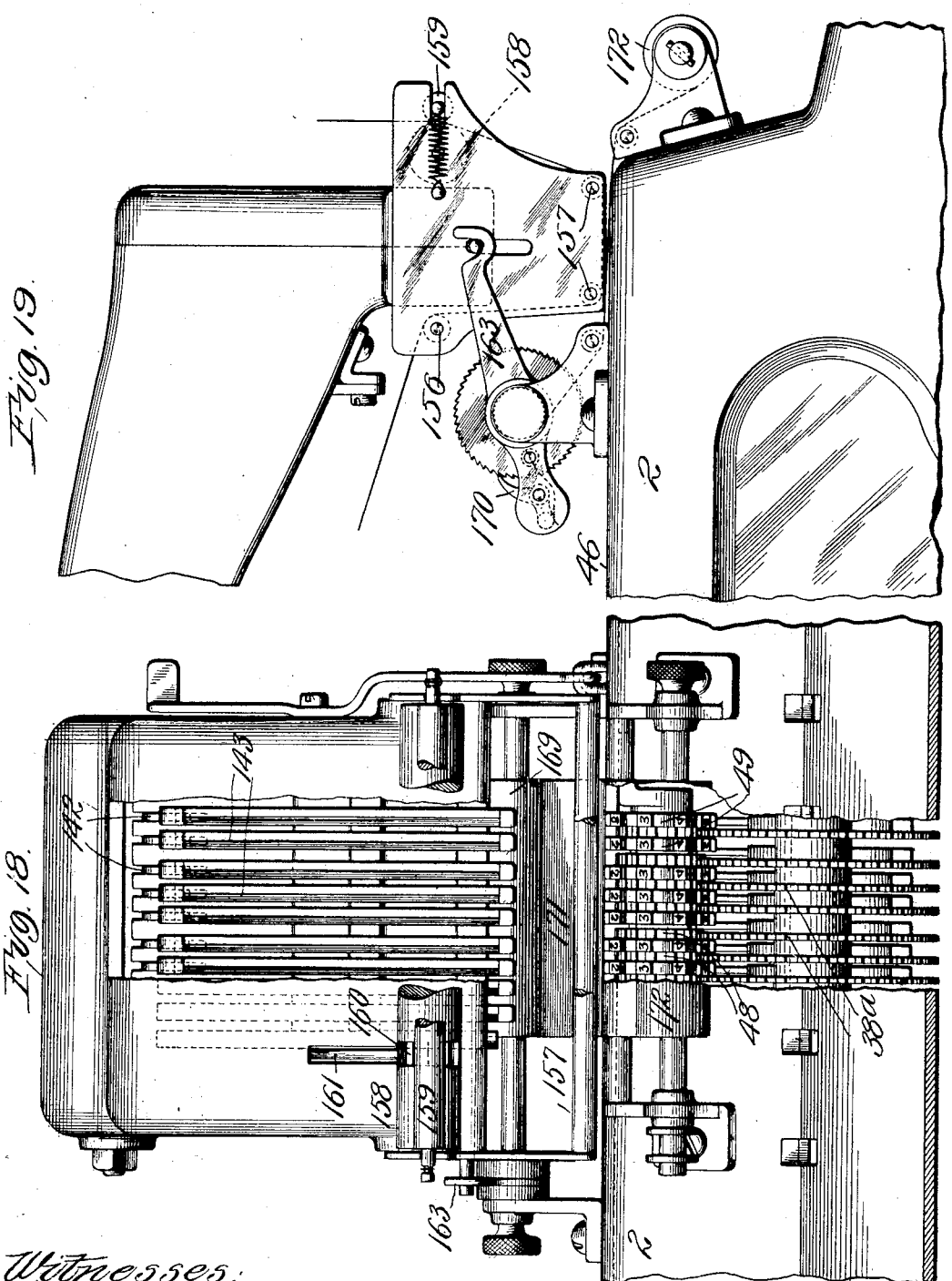
Witnesses:
Inventor:
Charles Stahlberg
by Bakewell & Cornwall
attys.

No. 744,697. PATENTED NOV. 17, 1903.
C. STAHLBERG.
CALCULATING MACHINE.
APPLICATION FILED MAR. 31, 1902.
NO MODEL. 18 SHEETS—SHEET 17.
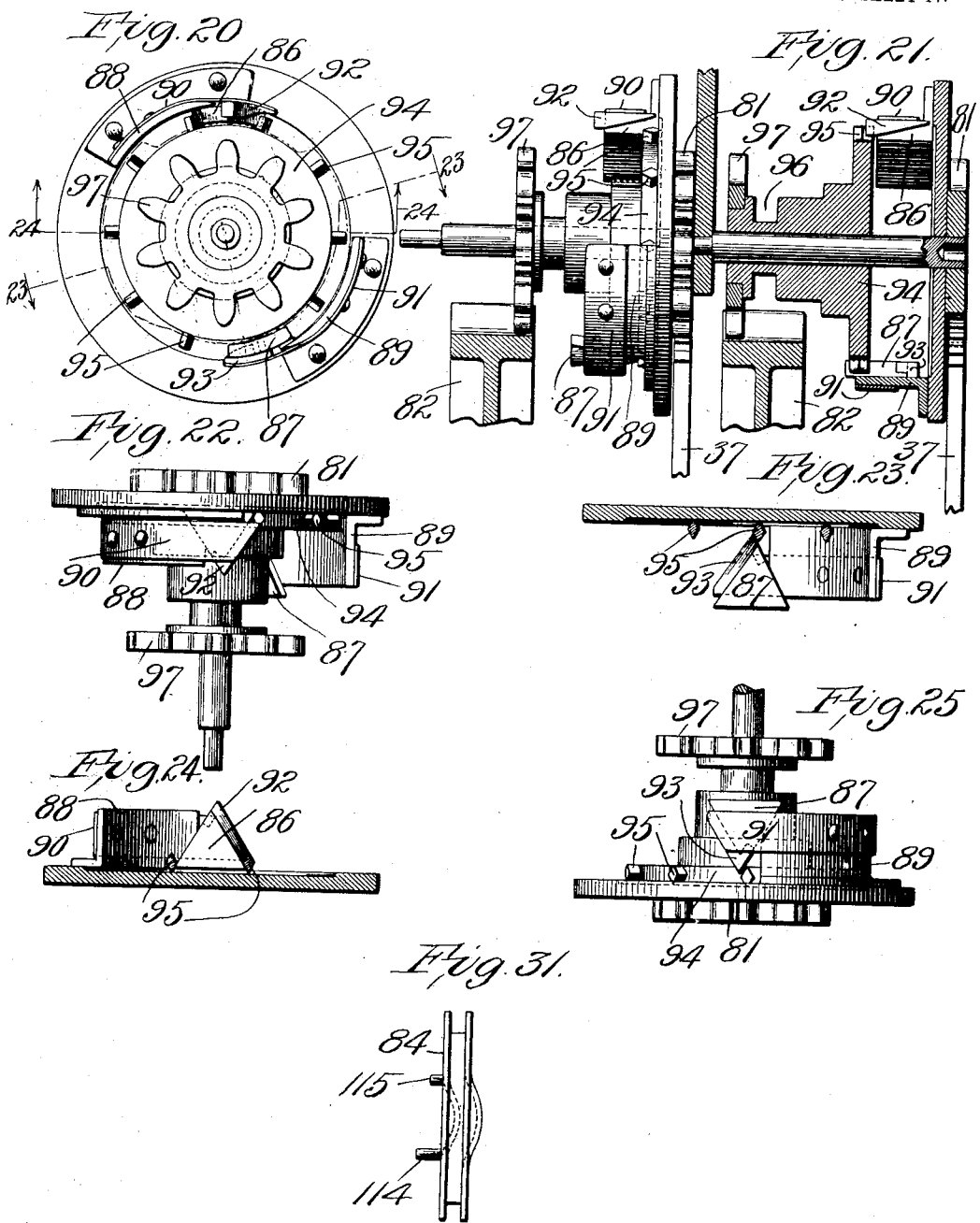

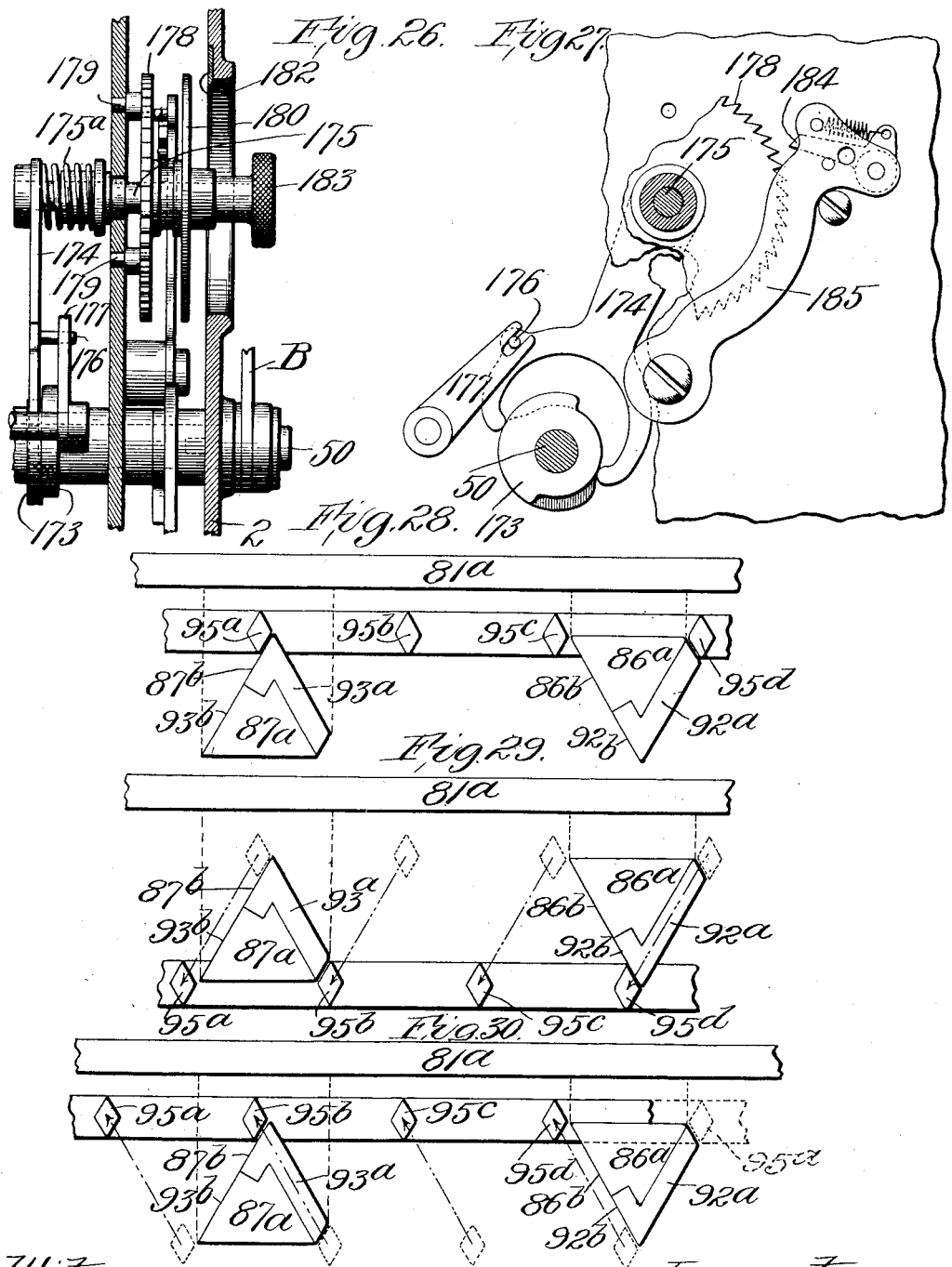

No. 744,697. Patented November 17, 1903.

UNITED STATES PATENT OFFICE.

CHARLES STAHLBERG, OF ST. LOUIS, MISSOURI.

CALCULATING-MACHINE.

SPECIFICATION forming part of Letters Patent No. 744,697, dated November 17, 1903.

Application filed March 31, 1902. Serial No. 100,789. (No model.)

*To all whom it may concern:*

Be it known that I, CHARLES STAHLBERG, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1 is a side elevational view of my improved calculating-machine. Fig. 2 is a plan view. Fig. 3 is a longitudinal vertical sectional view. Fig. 4 is a side elevational view, a part of the casing being broken away to more clearly show the interior mechanism. Fig. 5 is a vertical longitudinal sectional view through the keyboard, showing the parts in full size. Fig. 6 is a similar view showing the rear portion of the machine. Fig. 7 is a side elevational view of the rear portion of the machine, the casing being removed. Fig. 8 is a similar view showing the opposite or left-hand side of the machine. Fig. 9 is a front elevational view, partly in section, of the keyboard. Fig. 10 is a plan view, partly in section, of the keyboard. Fig. 11 is a plan view of a portion of the rear part of the machine. Fig. 12 is a sectional view on line 12 12, Fig. 6. Fig. 13 is a detail view. Fig. 14 is a sectional view on line 14 14, Fig. 8. Fig. 15 is a sectional view on line 15 15, Fig. 6. Fig. 16 is a vertical sectional view through the rear upper portion of the machine, showing the printing-head and its contained mechanism. Fig. 17 is a horizontal sectional view through said printing-head. Fig. 18 is a front elevational view, partly in section, of said printing-head. Fig. 19 is a side elevational view of the forward portion of said printing-head as seen from the left-hand side of the machine. Fig. 20 is a side elevational view of a part of the carrying mechanism. Fig. 21 is an edge elevational view of the same, partly in section. Fig. 22 is a top plan view of the same. Fig. 23 is a sectional view on line 23 23, Fig. 20. Fig. 24 is a sectional view on line 24 24, Fig. 20. Fig. 25 is an inverted plan view. Fig. 26 is a sectional view on line 26 26, Fig. 7, and Fig. 27 is a side elevational view of a portion of the mechanism shown in Fig. 26. Figs. 28 to 30 are diagrammatic views of the escapement, and Fig. 31 is an edge view of one of the cams.

This invention relates to a new and useful improvement in calculating-machines, the objects being to construct a machine of the character described which is simple in construction and which in operation is accurate and positive in action. The machine is designed to add, register, and record numbers and to expose the total of all the numbers registered in the machine, means being provided whereby the total thus accumulated in the machine may be recorded as a footing to indicate the sum of the items previously registered and recorded.

My invention consists, generally stated, in improvements applicable to machines of the class to which I have referred above and also in the construction, arrangement, and combination of the several parts, all as will hereinafter be described and afterward pointed out in the claims.

In the following description I will endeavor, as far as possible, to describe the construction and operation of the several parts of the machine under appropriate headings. Before entering into such a detailed description I will briefly outline the cardinal principles of operation.

A roll of paper upon which is to be printed several items is mounted in or adjacent to the printing-head and threaded through appropriate feeding devices, so as to receive the type impressions. The type-hammers are designed to deliver an impacting blow, so as to force the paper onto the printing-wheels to make a printing impression. These type-hammers are controlled by an operating-handle, which effects their release and permits of the delivery of the impacting blow and subsequently restores said type-hammers to an operative position ready for another operation.

The example to be registered in the machine and recorded on the paper is set up on the keyboard, as is commonly practiced in this class of devices. In setting up an example the movement of the keys operated releases control-bars, which are impelled by connected motors (in this instance springs) to move to one of nine different positions, depending upon the location of the key struck. The keys of the keyboard are numbered from "1" to "9" consecutively, and a row of such keys so numbered forms a series. There is a control-bar common to each series of keys. These spring-actuated control-bars drive what is termed an "item-train," which item-train rotates indicating-wheels and printing-wheels, so as to expose the example set up on the keyboard to the view of the operator and also to place in the printing-line the said example. The operator after an example has been set up on the keyboard now sets in motion certain devices which effect a connection between the totalizer-trains and the item-trains and also restore the item-trains to zero position and place the item thereinbefore indicated in the totalizer-trains. This mechanism in the form of an operating-handle upon its initial movement releases the type-hammers before described to make an impression of the item set up in the type-wheels, and subsequently the same operating-handle restores the type-hammers to a cocked position. In the several totalizer-trains referred to, and there is one of such trains for each item-train, are located transferring devices whereby when a totalizer-train—say in the units-column—is actuated beyond a certain point, as when more than ten units have been totalized in said units-train, what is equivalent to ten of those units is transferred into the totalizer-train identified with the tens-column. This transferring mechanism is operative in the totalizer-trains to drive the next adjacent train of higher order, notwithstanding the fact that said driven train of higher order may at the time it is being driven by the train of lower order also be receiving motion from the item-train. In this manner no exteriorly-arranged dogs or pawls are tripped by a train of lower order, nor are means relied upon, which means are usually only effective when the totalizer-trains are in a position of rest, to apply power in the resetting of the dogs to operate the totalizer-train of higher order.

After a series of items or examples are totalized in the totalizing mechanism, and the correct total is always present in said totalizing mechanism without requiring any additional operation of the machine, and it is desired to determine what that total is certain mechanism is operated which will cause the said total to appear in the item-indicating wheels. This total is also printed at the foot of the column of figures, and after such operation or obtaining the "total," as it is called, the said total may be retained in the totalizer or the machine may be cleared.

To prevent improper operation of the several mechanisms of the machine at improper times, locking and interlocking devices are provided, as will hereinafter be described.

In addition to the above there is also provided what is known as the "repeating" mechanism, which mechanism can be set into position for action when the machine is used to multiply.

*The casing.*—1 indicates a base, preferably in the form of a casting, which extends the entire length of the machine.

2 indicates a casing or housing designed to fit snugly on the base-casting to exclude dirt, dust, &c., from the moving parts. This casing is provided with appropriate openings to accommodate the different parts of the machine which project therethrough to the exterior and is also provided with a series of sight-openings immediately to the rear of the keyboard, through which the indicator-wheels are exposed in order that the operator after setting up an example may from a glance at the indicator-wheels determine whether the example is properly placed in the machine. The "keyboard," as it is termed, is so constructed that it is removable as an entirety from the base-casting. The item and totalizer trains are also preferably mounted in a frame removable from the base-casting, and the printing-head is also removably mounted, all of which is a matter of convenience, contributing to the ease of manufacture, readiness in repair, and assemblage of parts.

*Keyboard.*—The keyboard is best shown in Figs. 3, 5, 9, and 10. 3 indicates corner-posts secured to the base-casting and supporting at their upper ends a plate 4, through which project the depressible keys. These keys are provided with heads 5 at their upper ends, which heads bear numerals, depending upon the position of the key in its series.

6 indicates the shanks or stems of the keys, which near their lower ends are provided with lateral projections or shoulders 7. (See Fig. 9.) The lower ends of the key-stems pass through a bottom plate 8 and are formed with reduced annuli, in which are arranged stops in the form of spring-washers 9 for arresting the keys in their upward movement.

10 indicates strips extending transversely the keyboard and across the upper face of plate 8, said strips being mounted in longitudinally-arranged bars 11, as shown in Fig. 9. These strips are formed with alined openings, in each series of which is arranged a pivot-rod 12.

13 indicates stops in the form of bell-crank levers mounted on the rods 12, there being one of such stops for each key in the keyboard. The horizontal member of each of these bell-crank levers is provided with a lateral pin or projection 14, which coöperates with the shoulder 7 of its respective key. A spring 15, preferably coiled about the rod 12 and having one end in engagement with the strip 10 and its other end in engagement with the stop 13, bears at all times to swing said stop on its pivot and to hold the associated key in an elevated position, as determined by the stop 13. The upper end of the stop 13 is provided with a recess 16, forming a hook which when the stop is actuated coöperates with a latch-plate, so that said stop is temporarily locked in an abnormal position and its associated key remains depressed. The upper end of the stop is also provided with a shoulder 17, which is designed to coöperate with its associated control-bar.

The latch-plate referred to is pivotally mounted in cross-bars 18 and is provided with a series of upwardly-extending tongues 19, arranged, respectively, in the paths of movement of the several key-stops in the series of keys to which the latch-plate is common. The forward end of the latch-plate carries a supporting-post for its coöperating control-bar, and when the latch-plate is in normal position its control-bar is held in an elevated position by this post 20, which determines the zero position of the item-train. For this reason the post 20 may be called the "zero-post." The latch-plate at its rear end is provided with a winged extension 21, designed to coöperate with a spring-pressed pawl 22, mounted on the upper face of a rocking bar 23. When the latch-plate is in normal position, it is out of engagement with said pawl; but when said latch-plate is swung on its pivot by the operation of any of the key-stops in the series to which it is common the winged extension 21 will ride beyond the pawl 22 and said latch-plate will become locked in what may be termed an "abnormal" position, and in this position the stop will be held in engagement with its coöperating tongue by reason of the hooked upper end of said stop, as shown in Fig. 9. When the bar 23 is rocked, the pawl is moved away from the winged extension, and a spring 24, connected to the latch-plate, restores the same to normal position and permits the stop to be influenced by its spring 15 and restore the associated key to an elevated position, the finger of the operator of course having been previously removed from said key.

From the above it will be noted that whenever a key is depressed its associated stop will be swung laterally into engagement with the tongue of the latch-plate in its path; that the latch-plate is rocked out of its normal position and in such movement the zero-post is moved from under the end of the control-bar, permitting said control-bar to fall until arrested by the upper end of the stop presented thereunder by the actuated key; that the pawl locks the latch-plate in an abnormal position; that the hooked upper end of the stop prevents the stop from becoming disengaged from the tongue of the latch-plate, and thus the stop is locked in an abnormal position; that the shoulder 17 prevents the stop from being restored to normal position and from releasing the latch-plate, notwithstanding the fact that the winged extension 21 may not have ridden past its locking-pawl 22; that the arcs of movement of the latch-plate and stops are different; that when a latch-plate is swung on its pivot and held in such position the upper edges of its tongues are elevated; that if any other key in that series is depressed the hooked upper ends of the actuated stops, if the operated key is of lower denomination, will contact with the control-bar and be prevented from engaging the tongue of the latch-plate in its path, and that if the operated key is of higher denomination the hooked upper end of the stop will be prevented from effectively engaging the latch-plate on account of the arc through which it moves. When a key in a series is depressed and the control-bar common to the series in which that key is located reaches the position determined by the stop actuated by the depressed key, no other key in that series, if operated, can affect or change the position of the control-bar. If the operator makes a mistake, the correction key or lever may be resorted to to clear the keyboard without placing the item in the totalizer. This enables the operator to properly set up the example on the keyboard. If two keys in the same series are simultaneously depressed, the one of lower denomination will control, as the control-bar will first come in contact with its stop. Under such circumstances the operator by glancing at the item exhibited by the indicator-wheels will ascertain that the item-train has moved to a position the same as if the key of lower denomination only had been depressed, and if it was intended to depress the key of higher denomination the keyboard can be cleared by operating the correction-key and the example set up anew therein.

*Simultaneous release of the control-bars.*—25 indicates a lateral projection extending from each wing 21, said projection having a notch 26. (See Fig. 9.)

27 indicates a rock-shaft extending transversely the keyboard, said shaft being provided with a spring 28, whereby the arms 29, carried by said shaft, are normally held behind (or in front of) the notched lateral projections 25.

By referring to Fig. 9 it will be noticed that the third key-shank from the right has been depressed and that the latch-plate is locked in engagement with the key-stop. The abnormal position of the latch-plate, upon which is carried the notched projection 25, places the end of said projection 25 in the path of its coöperating rock-arm 29 on the shaft 27. Thus when any key in the keyboard is depressed the shaft 27 cannot be rocked; but when the keyboard is in normal position all of the notches 26 register with the arms 29, enabling the shaft 27 to be rocked forwardly, the rock-arms carried thereby being received in the notches 26, and when the shaft is moved longitudinally (to the right) it will cause all of the latch-plates to be swung on their pivots so that their zero-posts will be removed from the ends of the control-bars, permitting all of the control-bars to descend simultaneously. It will be seen from the above that the shaft 27 has a rotary as well as a longitudinal movement, the spring 28 tending to hold said shaft in normal position at all times. It will also be noticed that when any key in the keyboard is depressed the shaft 27 cannot be manipulated so as to release any of the control-bars.

As one operation of taking a total is the release of all of the control-bars, it follows from the above that when an example is set up on the keyboard all of the control-bars cannot be released, and thus an effective lock is provided to prevent the taking of a total while an example is set up on the keyboard. I will presently describe a lock for the keyboard to prevent its operation during the taking of a total, and in this connection I will now call attention to the fact that when the shaft 27 is operated to manipulate all of the latch-plates said latch-plates are swung on their pivots so that their upper edges are elevated. In this position of the latch-plates, as previously described, should any key in the keyboard be depressed the hook 16 cannot coöperate with its latch-plate, and consequently no example can be set up on the keyboard when all of the latch-plates are elevated.

*Control-bars.*—Referring to Fig. 3, it will be observed that the control-bars 30 are pivoted upon a shaft 31 at their rear ends, their forward ends being guided in vertical movement by a slotted strip 31ᵃ. (See Fig. 9.) A stop 32 is provided on the under side of the top plate of the keyboard for arresting the upward throw of the control-bars.

Each control-bar has its lower edge formed with a series of steps, so that, depending upon the position of the operated key in the series, the control-bar will be arrested in one of nine different positions.

As before stated, the control-bar normally rests on the zero-post of the latch-plate, and when any key is depressed the latch-plate is rocked, so that the control-bar falls to one of its nine different positions, and in so falling the released control-bar will move a segment 33, connected therewith, to which segment is connected a spring 34, said spring assisting gravity in causing the control-bars to descend. In Fig. 6 I have shown the parts in their natural size.

*The item-trains.*—Segment 33 meshes with a segment 35, mounted upon a shaft 36, which segment 35 is conjoined to a segment 37, which for purposes of distinction will be termed the "driving-segment," because when the control-bar common thereto is operated by the keyboard said segment drives the item-train to indicate the position of rest of said control-bar, and in restoring the item-train to zero position the totalizer-train is thrown into mesh with this driving-segment and the item previously set up on the keyboard is placed in the totalizer-train.

Meshing with segment 37 is a gear 38, mounted upon a shaft 39, which shaft preferably extends entirely across the machine. (See Fig. 11.) In order to group the item devices within a small compass, I provide a series of gears 38ᵃ on the shaft 39—in this instance in the center of the machine—and transfer the motion which is imparted to the gears 38 to the gears 38ᵃ through the medium of intermediate pinions 40, mounted on shafts 41, respectively, which shafts for the purpose of saving space are divided and have their inner ends journaled in a plate 42, arranged at the center of the machine. (See Fig. 15.)

*The item-indicating disks.*—The item-indicating disks 43 (see Figs. 6 and 11) are mounted on a shaft 44 and have pinions 45 conjoined to them, respectively, which pinions mesh with the gears 38. Thus when the gears 38 are actuated the extent of such movement is indicated by the disks 43, which have the numerals from "1" to "9," including the "0" character, on their peripheries. The frame-plate of the machine is provided with a sight-opening, through which the item-indicating disks may be seen by the operator.

*Printing or recording wheels.*—46 indicates the top plate of the machine, which top plate carries the printing-head, and in practice I prefer to mount in a suitable bearing extending from this top plate a shaft 47, (see Fig. 16,) which shaft carries loosely mounted upon it pinions 48, conjoined to printing-wheels 49, the printing characters or type on the peripheries of said wheels being exposed through an opening in the plate 46. In this manner the items set up on the keyboard are made to appear in the printing-wheels.

*Restoring the item-trains.*—50 indicates a shaft mounted in suitable bearings and extending transversely the machine, upon one end of which shaft is arranged a lever or operating-handle A. (See Figs. 2 and 8.) Shaft 50 carries a series of restoring-cams 51, which cams coöperate with lateral projections or rollers 30ᵃ on the control-bars, whereby when any of said control-bars occupy other than normal position the depression of lever A will cause the cams 51 to rock forward and restore the control-bars to their elevated positions.

Lever A is preferably loosely mounted on the shaft 50 and, as shown in Fig. 8, is provided with an arm 52, which coöperates with a pin 53, arranged on an arm 54, fixed to the end of shaft 50, whereby when lever A is depressed the shaft 50 is caused to rock. A spring 55 is attached to the arm 52, holding the same against a stop-pin 56, whereby the lever A is held in an elevated position and the shaft 50 and its carried parts are permitted to be rocked forward independently of the lever A.

A spring 57 is connected to one of the cams 51 to restore the same to normal position.

In order to recover cams 51 and retract them from their positions under the lateral projections 30ᵃ, the spring 57 is resorted to in the event that the handle A is not depressed. Spring 55 merely serves to restore the handle A to its elevated position.

In the event that an item is set up on the keyboard and it is not desired to place said item in the totalizer, the handle A is operated, which results merely in restoring the keyboard and item-trains to normal position. The totalizing mechanism is normally disconnected from the item-trains, and consequently the operation of handle A will not place said item in the totalizer.

*Placing the items in the totalizer.*—Referring now to Fig. 7, it will be observed that the shaft 50 carries an arm 58, which is fixed thereto, and that said arm is in the path of a pin or projection 59, carried by a cam-plate 60. This cam-plate 60 is loosely mounted on shaft 50 and has conjoined thereto an operating-handle B. Whenever handle B is depressed, the cam-plate 60 is raised; but by reason of the clearance between the pin 59 and the arm 58 the shaft 50 will not be operated upon the initial movement of handle B, and consequently the item-trains and keyboard will not be restored to normal position until after this initial movement of handle B has been completed. The initial movement of handle B, above referred to, is utilized to throw the totalizer-trains into connection with the item-trains and also to effect the printing of the items upon a strip of paper before the items are placed in the totalizer.

Cam-plate 60, referred to, is provided with a cam-slot 61, the upper end of which constitutes the working face, while the lower end is substantially concentric to the shaft 50. In this cam-slot is received a cam-roller 62 upon the end of a lever 63, said lever being pivoted at 64. In operation the initial movement of handle B effects a rocking of lever 63, said rocking movement being completed about the time that the pin 59 contacts with the arm 58, after which lever 63 is held stationary by its roller riding in the concentric portion of the cam-slot, and during this period that lever 63 is held stationary the item-trains and the keyboard are being restored to their normal positions. A spring 65, connected to the rear end of lever 63, tends to hold the said lever in normal position.

Through the medium of the lever B, as will have been gathered from the above, the printing of the individual items is effected. Then the totalizer-trains, as will now be described, are thrown into connection with the item-trains. The continued movement of lever B will hold the totalizer-trains in connection with the item-trains, said continued movement restoring the item-trains and keyboard to normal positions, and lever B will also reset the type-hammers. All of the above is accomplished on the downward movement of lever B, and when said lever is released its restoration to normal position will effect a disconnection of the totalizer-trains and the item-trains.

*Engaging the item and totalizer trains.*—The totalizer-trains are individual to the respective item-trains and are arranged upon suitable shafts carried by frame-plates 66, pivoted at 67 in the side frames of the machine. Springs 68 hold the totalizer-trains normally out of connection with the item-trains.

To effect the connection of the totalizer-trains with the item-trains by the movement of lever B, I provide what might be termed an L-shaped slot 69 in the lever 63, into which slot projects the cam-roller 70, extending from one of the frame-plates 66. When the upper end of lever 63 is rocked forwardly, it is obvious that the totalizer-frame is depressed, so that the primary pinions thereof are thrown into mesh with the driving-segments 37.

*Locking the totalizer-trains.*—Referring to Fig. 6, it will be seen that pawls 72 have their free ends in engagement with the primary pinions of the totalizer-trains. These pawls are mounted upon a rock-shaft 73, which rock-shaft is provided with pins 74, to which the springs 68 are connected. These springs in addition to holding the totalizer-frame in normal position also force the free ends of pawls 72 into engagement with their coöperating pinions. The shaft 73 is mounted in the totalizer frame-plate, and upon one end thereof is arranged an arm 75, (see Fig. 8,) the outer or free end of said arm being provided with a pin or lateral projection 76, which is designed when the totalizer-frame is depressed to contact with the end of one member of a bell-crank lever 77. This bell-crank lever is pivoted at 77ª and is provided with a spring 78 to hold it in its normal position. The other member of this bell-crank lever has a pin or roller 79, which is designed to ride upon a cam-face 80, provided by a track extension on the arm 54. It will be remembered that the arm 54 is fixed to the shaft 50 and moves with the restoring-cams 51. When the lever B is depressed, the rocking of the totalizer-frame will cause the pin 76 to contact with the end of bell-crank lever 77 in its path, and when the arm 58 of shaft 50 is picked up the first movement thereof causes the pin or roller 79 to ride up on the cam-track 80 and rock the lever 77, so as to effect a release of the primary gears of the totalizer-trains by raising the pawls 72 out of engagement therewith.

*The totalizer-trains.*—As all of the totalizer-trains are substantially the same, I will describe but one of them. 81 indicates what I have termed the "primary" pinion of the totalizer-train, which pinion is the one shown engaged by the locking-pawl 72 and which pinion is the one designed to mesh with the driving-segment 37. (See Fig. 6.) This pinion drives a pinion 97, which is in mesh with a gear 82, with which gear meshes a pinion 83, having conjoined to it a cam-disk 84. It is the function of this cam-disk by a peripheral groove (see Figs. 11 and 12) to vibrate an arm 85, whose free end extends forwardly and coöperates with an escapement identified with the next adjacent totalizer-train of higher order.

The shafts upon which the pinions 81 and the gears 82 are mounted preferably find bearings in frame-plates which are mounted in position on through-bolts secured at their ends to the rocking frame-plate 66. The purpose of this is to provide separate bearings for the shafts of pinions 81 and gears 82, whereby friction is reduced.

I will here state that whenever an item is placed in the totalizer and the handle B depressed all of the primary pinions of the several totalizer-trains are thrown into mesh with the driving-segments 37, and if said driving-segments have been displaced by the key-board the operation of the handle or lever B will serve to restore them. If, on the other hand, some of the driving-segments have not been actuated from the keyboard, the primary pinions 81 will be locked in stationary position. In fact, it might be said that the pinions 81 are locked to the driving-segments, and if said segments remain stationary in the operation of the machine the pinions 81 remain stationary, while, on the other hand, if the driving-segments are restored the primary pinions 81 are rotated, but in being rotated are still locked in mesh and are prevented from any independent rotation except that imparted to them by the driving-segments.

*Transferring.*—Means are provided for transferring from a totalizer-train of lower order to the next adjacent train of higher order, whereby the proper total of the items will at all times appear in the totalizer. This "transferring," as I have termed it, is effected through a novel escapement mechanism. (Illustrated more clearly in Figs. 20 to 25.) In connection with my description of these transferring devices I will also refer to the diagrammatic views illustrated in Figs. 28 to 30. However, before entering upon a detailed explanation of the operation of this transferring mechanism I will state that the pinion 81 carries, preferably through the medium of a disk conjoined thereto, two or more escapement-teeth, which are triangular in shape, said teeth being oppositely placed with respect to their carrying-disk—that is, one of them, 86, has its apex remote from the disk, while the other, 87, has its apex adjacent the disk. These teeth are carried by flanges 88 and 89, respectively, which flanges also afford supports for leaf-springs 90 and 91, which leaf-springs at their free ends are provided with movable or yielding sections 92 and 93, respectively, said sections forming the apices of the teeth. The inner faces of these yielding sections are inclined, the crown of each tooth being the deepest portion of its yielding section, and in this manner I am enabled to place the shallow portion of each yielding section over the pallet-teeth of the pallet-wheel, whereby upon the movement of said pallet-wheel the teeth force the yielding sections outwardly until they ride past the apices of the teeth, the springs forcing said yielding sections inwardly in the path of the pallet-teeth, so as to impart a rotary motion to the pallet-wheel. This "pallet-wheel," as I have termed it, is indicated at 94 and carries diamond-shaped pallet-teeth 95 on its periphery. The hub of the pallet-wheel is provided with an annular groove 96, in which is received the free end of vibrating arm or lever 85, which is operated by the next adjacent train of lower order. The pallet-wheel also has conjoined to it a pinion 97, which is in mesh with the gear 82, said gear 82 having a face of sufficient width to enable the pallet-wheel and its conjoined pinion 97 to be moved longitudinally their supporting-shaft without disengaging the pinion from said gear 82. It will of course be understood that in connection with this transferring mechanism the primary gear 81 identified with the totalizer-train in the "cents-column" is not provided with an escapement mechanism, because there is nothing of lower order to be operated to advance the said "cents-train." All of the primary gears 81 in the totalizer-trains identified with columns of higher order, however, carry the escapement-teeth, because all of said trains are capable of being operated and advanced one-tenth of a revolution upon the operation of the next adjacent train of lower order. I have used the term "escapement" in connection with this transferring mechanism because of the resemblance of this movement to its prototype commonly found in other mechanisms. There are, however, differences which will appear in the following description. I will also state here, by way of explanation, that the vibration of the lever 85, operated by a train of lower order, is converted by this escapement mechanism into a rotary motion to advance the train of higher order in which the escapement mechanism is located and that the advance motion imparted to the train of higher order occurs whether the said train of higher order may at the time be stationary or may at the time of receiving said motion be driven by its item-train. In the event that the train of higher order receiving motion from the escapement mechanism is being driven by its individual item-driving mechanism the vibration of the arm from the train of lower order will accelerate the motion in the train of higher order, advancing it a distance which for the sake of convenience may be termed "one-tenth" of a revolution. I will also state that the first or initial movement of the arm 85 through the escapement mechanism forces the pallet-wheel and its attached pinion to be rotated one-twentieth of a revolution, resulting from the operation of one pallet, and at the termination of this motion another pallet is placed in position and becomes operative on the second half of the stroke or return movement to advance and drive the pallet-wheel and its conjoined pinion another one-twentieth of a revolution.

Normally the pallet-wheel is locked to and rotates with the primary gear 81, so that any motion imparted to the totalizer-train from the driving-segments 37 through the primary gear 81 will be positive and direct.

Referring now to Figs. 28, 29, and 30, the first of said figures represents the parts in their normal or home position, the second represents the position of the parts when the pallet-wheel has completed one-twentieth part of a revolution, and the third represents the position of the parts when they are restored to home position and when the pallet-wheel has completed the final twentieth or, all told, one-tenth of a revolution. I will assume in these diagrammatic views that the support $81^a$ represents the disk which is conjoined to the primary gear 81 and that the same is held stationary. The escapement-teeth $86^a$ and $87^a$ are carried by this stationary support $81^a$. The yielding crowns $92^a$ and $93^a$ are thickest at the apices of the teeth and are thinnest at their heel portions. The pallet-teeth are designated as $95^a$, $95^b$, $95^c$, and $95^d$ and are so located that any outward movement away from the stationary support $81^a$ will cause them to travel under the inclined face of the yielding portion $92^a$. For the sake of distinction I will describe the triangular teeth as having a yielding side formed by the portions $92^a$ and $93^a$, which yielding side does not force the pallets laterally, and that said triangular teeth have at their opposite sides inclines in the form of immovable working cam-faces, consisting of the edges $92^b$ and $86^b$ and $93^b$ and $87^b$, respectively.

With reference to Fig. 28 it will be observed that the pallet $95^a$ is in position to ride outwardly along the immovable faces $87^b$ and $93^b$ and that the pallet $95^d$ will ride under, lift, and pass beyond the movable crown $92^a$ when the pallet is moved away from the fixed support $81^a$. This movement will enable the pallet $95^a$ to positively drive the pallet-wheel the distance indicated in Fig. 29 at the completion of the first half of the stroke. At the end of the first half of the stroke, as will be seen in Fig. 29, the pallet $95^d$ will have passed beyond the yielding portion $92^a$ and will be in a position ready to move down the movable cam-faces $92^b$ and $86^b$; also, that the pallet $95^b$ has been moved into position to ride under the yielding crown $93^a$ as the pallet-wheel makes the second half of its stroke. The second half of the stroke will positively move the pallet-wheel by reason of the engagement of the pallet $95^d$ with the immovable faces $92^b$ and $86^b$, the conclusion of the last half of the stroke placing the pallet $95^b$ beyond the yielding tooth-crown $93^a$ or in the position formerly occupied by the original driving-pallet $95^a$. The pallet $95^c$ at the conclusion of the final stroke will also be advanced to the position formerly occupied by the pallet $95^b$. Thus vibrations of the pallet-carrier will, considering the disk $81^a$ as being locked to the driving-segment, circumferentially displace said pallet-carrier and its conjoined pinion 97 a distance of one-half a tooth on the first movement or half-stroke of the pallet-carrier, the second movement or half-stroke of the pallet-carrier effecting the final circumferential displacement or partial rotation thereof. As the escapement-teeth are so proportioned that these partial rotations of the pallet-carrier equal, respectively, one-twentieth of a revolution thereof, it follows that the combined movements result in advancing the pallet-carrier and its conjoined gear 97 one-tenth of a revolution.

The above description applies to the machine shown in the drawings, where the decimal system is employed. It is obvious, however, that with slight changes in the gearing the machine shown in the drawings could be readily adapted for use in other systems—as, for instance, that extant with respect to the currency in Great Britain.

For the sake of distinction I will term the arm 85 as the "vibrating" element and the pallet-wheel, which coöperates with the escapement-tooth, as the "reciprocating" element, such terms being followed in the claims.

*The long-stroke cam.*—The cam-disk 84 has a fluctuation in its peripheral groove extending a short distance each side the actual throw necessary to be imparted to the vibrating arm 85, whereby said vibrating arm has imparted to it an excess movement. The excessive length of this cam is to compensate for inequalities in manufacture or the play which is necessary between moving parts to avoid undue friction. To explain the purpose of this long-stroke cam, reference will be made to the pallet-wheel and the work it performs. The pallet-wheel operates the totalizer-train in which it is located and is operated by the vibrating arm 85 under control of the cam 84 in the next adjacent train of lower order. After the pallet-teeth pass under the yielding crowns of the escapement-teeth they must be free, and, furthermore, this free movement before they become operative must be compensated for, and this is done by the cam. Of course the apex of the cam or point of greatest throw is such as to force the pallet-wheel laterally slightly beyond the distance actually required to insure the pallet-teeth permitting the yielding portions of the escapement-teeth to drop behind them.

The cam 84 shown in the drawings extends around one-fifth of the periphery of the disk. One-twentieth part of the circle at each end of the cam is allowed for lost motion, correction of inaccuracies, and to insure the positive operation of the pallet-wheel. The remaining or middle portion of the cam, including one-tenth of the circle, is what I will call the "working" face. Assuming that the arm 85 is vibrated when coöperating with the cam, it follows that the throw of the arm in effectively vibrating the pallet-wheel is excessive, and this excessive throw is utilized in forcing the pallet-wheel well toward the disk conjoined to the pinion 81, so as to insure the release of the pallet-teeth from the yielding portions of the escapement-teeth. The necessity for this excess throw of the arm will be appreciated when it is considered that an example is set up on the keyboard—such, for instance, as by the pressing of the "9" keys. If this item is placed in the totalizer-trains, assuming that said trains are moved from zero position, all of the rollers of the several vibrating arms 85 will have entered the fluctuations of their respective cams, and the arms will have been displaced slightly, so as to be in a position to positively move the train of higher order upon the next actuation thereof. If "1" is now set up in the cents-column, the totalizer-trains must carry entirely across the machine. Upon placing "1" in the totalizer it is carried entirely across the machine; but in being so carried the several vibrating arms will not leave the fluctuations of their cam-grooves, they having imparted only the amount of motion required to advance the trains of higher order one-tenth of a revolution or less. It is impossible to manufacture the moving parts with such a degree of accuracy that all of the escapement-teeth will be properly placed and ready to operate at the next operation of the machine, and consequently when another example is set up on the keyboard the first twentieth portion of the revolution of the cam in the actuated totalizer-train will be consumed in properly setting the pallet-teeth in the next adjacent train of higher order, so that when said next adjacent train of higher order is again operated the operation will be positive. It may be said, therefore, that in the operation of my machine the transferring mechanism does not at all times stand fully carried. A totalizer-train receiving motion from the next adjacent train of lower order is not fully carried; but in the event of an item going into the train of lower order the first movement thereof effects a full carrying. However, in the event that a total is desired all of the totalizer-trains which have not previously been operated in a natural way—that is, by being operated from an item placed in the keyboard—must be operated, so as to stand fully carried before the total is taken. This is accomplished by correcting the position of all of the cams by means of what I term "truing-wheels."

*Total lever or handle.*—100 indicates a shaft extending transversely the machine, which shaft has fixed to its outer end an operating handle or lever C. The hub of lever C has conjoined to it a cam-plate 101, (see Fig. 8,) which cam-plate on its initial movement throws the totalizer-trains into engagement with the driving-segments, raises the pawl 72, so as to unlock the totalizer-trains, locks the keyboard against manipulation during the time that a total is being taken, operates the truing-wheels to cause the long-stroke cams to fully carry, and finally sets into position the zero-stops for the cams 84, whereby when the driven item-trains are released they will reversely rotate the totalizer-trains, restoring said totalizer-trains to a zero position and in so doing place the total in the item-trains.

*Engaging totalizer and item trains by total-lever.*—The periphery of the cam-plate 101 is formed with a fluctuation or dip, in which normally rests a cam-roller 102 on one arm of what I will term a "spider-lever" 103. The upwardly-extending member of this spider-lever is formed with a cam-face 104, which coöperates with a roller 105 on the totalizer-frame, whereby when the spider-lever is rocked by the cam-plate 101 the primary pinions 81 of the totalizer-trains are caused to mesh with the driving-segments 37 through the medium of the cam-face 104, coöperating with the roller 105. The spring 55, which restores lever A to normal position, is also connected to the spider-lever 103 and tends to hold the same in its normal position. However, the spring 28 on shaft 27 is relied upon to hold the spider-lever 103 in normal position.

*Unlocking the totalizer-trains by total-key.*—As stated before, when the totalizer-frame was depressed the pin 76 was brought forward to contact with the bell-crank lever 77; but such movement did not unlock the primary pinions 81, the bell-crank lever 77 having to be rocked by the cam 80 to effect this. In order to effect the release of the primary pinions 81, I provide a bell-crank lever 106, one of whose members is formed with a cam-face designed to coöperate with the pin 76 and by rocking the shaft 73 raise the pawls 72. This bell-crank lever 106 is operated by a link 107, connecting its opposite member with the cam-plate 101.

*Locking the keyboard by total-key.*—To lock the keyboard against operation during such time as the total-lever C is in other than a normal position, I connect one arm of the spider-lever 103 by a link 108 to an arm 109 on the end of the shaft 27. Thus when the spider-lever is rocked the rod 27 is also rocked and its arms 29 caused to enter the notches 26, carried by the latch-plates, so that said latch-plates cannot be swung on their pivots by the depression of any key in a series, but can only be moved by moving the rod 27 longitudinally, said rod being provided with a head on one end for effecting this longitudinal movement, as shown in Fig. 2.

*Operating truing-wheels by total-key.*—The cam-plate 101 carries a spring-pressed pawl 110, whose upper end is designed to coöperate with the projections on a star-wheel 111, mounted on a shaft 112. This shaft extends across the machine (see Fig. 12) and carries a series of star-wheels 113, rotating in proximity to the cam-disks 84. Each cam-disk carries two pins traveling in different paths, one of them, 114, being designed in certain positions of the disk 84 to be struck by the teeth of its coöperating star-wheel, and in this manner the cam-disk is forced to make a partial revolution, which results in causing said cam-disk to fully carry in the event that it stands uncarried. In order to hold the star truing-wheels in proper position, I provide a spring-pressed pivoted dog 112ª for the wheel 111. (See Fig. 8.) As the lever C is moved rearwardly the pawl 110 will engage the tooth of the wheel 111 in its path, forcing said wheel to rotate one-sixth of a revolution, until the next tooth falls in the notch of the spring-pressed centering-pawl 112ª. After the total is obtained and the lever C is permitted to move forward the yielding pawl 110 is depressed and does not actuate the star-wheel, the spring connected to said pawl, however, setting the same the instant it is freed for another operation of the star-wheel upon the next movement of the handle C rearwardly.

*Setting zero-stops by total-key.*—115 indicates a zero-pin on the cam-disk 84, which zero-pin is preferably shorter than the pin 114, (see Fig. 31,) so as not to interfere with the operation of the truing star-wheel 113.

116 indicates a longitudinally-movable bar carrying stops 117, which are normally out of the paths of the zero-pins 115. However, when said bar is moved longitudinally said stops are thrown into the paths of movement of the pins 115, and should the cams be released and rotated backwardly (by the spring-motors connected to the item-trains which are in mesh with the totalizer-trains in this operation) the totalizer-trains are brought to zero position. A spring 118 (see Fig. 12) holds the stop-bar 116 in normal position, so that its stops 117 are out of the paths of the zero-pin 115.

The end of the bar 116 is provided with a cam-slot 119, with which coöperates the bent end of a rock-arm 120. (See Figs. 8 and 14.) This bent rock-arm, in the form of an angled flight, is mounted upon a short shaft 121 and is connected by a slotted link 122 to the cam-plate 101. The purpose of the slot in the link 122 is to enable the star-wheels, operating in the direction of the arrow in Fig. 6, to lift the pins 114 and drive the cams 84 forwardly a partial revolution, so as to cause said cams to fully carry in the event that they do not stand fully carried, and when the cams are thus temporarily advanced by the truing star-wheels and when the lever C is approaching the limit of its downward movement the bent or angled rock-arm 120 engages the cam end of bar 116 and moves the same longitudinally, so as to force the stops 117 in the paths of the respective zero-pins 115. The truing star-wheels now release the pins 114, and the cams rotate reversely until their zero-pins are arrested by the stops 117, which determines the correct zero position of the cams. The advance movement imparted by the truing star-wheels causes the cams to fully carry, if they have not already in the natural operation of the machine been fully carried. It will be understood that the teeth of the truing star-wheels are so placed in normal position (see Fig. 6) that they will not interfere with the rotation of the cams 84—that is, said teeth will not be in the paths of movement of the pins 114. It will also be understood that should the cams occupy a position in which the pins 114 are beyond the reach of the teeth on the star-wheel the star-wheel will not advance the cams. In this connection it will be well to state that when any cam is in a position other than that intended to represent zero its pin 114 cannot be affected by the truing star-wheels.

From the above it will be observed that the only function of the truing star-wheels is to advance such cams as have been rotated to zero position by the escapement mechanism. If after being moved to zero position by the escapement mechanism any cam should be subsequently operated by its item-train, the incorrect position the cam occupied when at zero will be cured by the subsequent operation from the item-train. To more fully illustrate the necessity for these truing star-wheels, I will refer to the example heretofore given—that is, assuming that the "9" keys have been depressed and the cams stand in the "9" position, if "1" is now added in the cents-column it will be carried across the entire series by the cams and the escapement mechanism. As stated before, all of the levers 85 will be operated simultaneously to the highest points of their respective cams, and in this respect all of the totalizer-trains will be positively driven; but from this point on the relation between the cams ceases, because of the overthrow of the pallet-teeth necessary to insure their passing beyond the yielding crowns of the escapement-teeth. This overthrow may be likened unto lost motion. It is obvious in this operation that the cents-cam moves only to zero, which is not enough to bring the adjacent cam of next higher order to its full zero position, and so on along the entire line. If we use as a simile a hill having two inclines, we might say that all of the totalizers are driven when the vibrating arms 85 are going up the hill, and such motion is uniform; but going down the hill the vibrating arms may be dropped and brought to a position of rest at various points between the top of the hill and the bottom. Thus the pins 114 may occupy different positions in the series of totalizer-trains, all of which means a zero position for the cam which carries the pin; but should a total be taken when the cams are in this position the printing-type would be out of line, and perhaps some other character, such as "9," (which precedes the zero,) would be printed. When any of the cams are carried beyond "9" and less than "1," the pins 114 lie in a field swept by the teeth of the truing star-wheels, and consequently when a total is about to be taken the truing star-wheels are operated and pick up and carry the lagging cams forward to an abnormal position temporarily, so as to insure the cams occupying a fully-carried position, after which the pins are released, and the spring-driven item-trains force the cams backwardly until the pins 115 are brought to a proper zero position by engagement with the stops 117.

From the above the necessity for the long-stroke cam will be appreciated. If the cams do not stand fully carried, the lost motion must be made up in the event of any subsequent operation of the cams, and this is accomplished by the excess throw imparted by the cams to their associate vibrating levers 85, which vibrating levers, however, are of course connected to the adjacent totalizer-train of higher order.

*Determining the zero position of totalizer-train of highest order.*—As the totalizer-train of highest order—say the one identified with the "millions-column" in the machine shown in the accompanying drawings—does not operate a cam 84, because there is nothing to be carried beyond the millions-column, I provide a long stop 117$^a$ on the bar 116, which extends inwardly, so as to coöperate with pins 115$^a$ on the gear 82 of the millions-column. This stop 117$^a$ coöperates with the pins on this gear in the same manner as the stops 117 coöperate with the stops 115 on the cams 84.

*Taking a total.*—Assuming that several items have been set up on the keyboard and by manipulation of the lever B have been introduced into the totalizer-trains and that it is desired to obtain the total, the lever C is forced back to throw the totalizer-trains into engagement with the item-trains, the pawls 72 are raised to unlock the totalizer-trains, the keyboard is locked to prevent the setting up of an item therein while the total-key is held in its rearward position, the truing star-wheels are operated to cause the cams to fully carry, the zero-stops are set in position to coöperate with the pins 115 of such cams as are to stand in zero position, and these zero-stops remain in this set position during the time that the total-key is held rearwardly. The total-key is held in its rearward position during the time that a total is being obtained.

The total-key, as before stated, when operated also rocks the shaft 27 and engages the same with all of the latch-plates, whereby when the shaft 27 is moved longitudinally by hand all of the zero-posts are removed from the control-bars, and consequently the control-bars descend, the spring-motors connected thereto causing all the totalizer-trains to be reversely rotated to place the total in the item-trains. Should it be desired to retain the total in the machine, the handle B is depressed to restore the control-bars and place the total back in the totalizers before the total-handle is released. The spring 28 forces the rod 27 longitudinally, so that the latch-plates move the zero-posts under the control-bars and hold them elevated after the handle B has restored said control-bars.

*Clearing the machine.*—In the event that it is desired to clear the totalizers the total is obtained as before described; but instead of operating the handle B to restore the control-bars before the handle C is released the handle C is permitted to move forward, leaving the totalizer-cams in zero position, the final forward movement of the handle C disengaging the cleared totalizer. The instant that the totalizer-trains are thrown out of mesh with the item-trains the item-trains are moved to the "9" position by means of the springs connected to the control-bars, which control-bars in this action descend, as no means have been operated to restore them and place the zero-posts thereunder. The handle A is now operated to restore the control-bars and item-trains to zero position without disturbing the zero position of the totalizers.

*Variable power to drive item-trains.*—As shown in Fig. 6, the springs 34, which are the motor-springs for driving the item-trains and causing the control-bars to descend, are mounted in one edge of a plate secured to the shaft 100. The total-handle C is also fixed to the shaft 100. As additional power is required to drive the item-trains and the totalizer-trains when a total is being obtained—that is, more power is required to drive the two trains combined than an item-train by itself—I attach the ends of the motor-springs 34 to this plate, which I have indicated at 123, so that when the handle C is moved rearwardly to obtain a total a greater tension is placed in the springs 34. This greater tension enables the employment of light springs of sufficient power to drive the item-trains, (when the totalizer-trains are disconnected therefrom;) but when a total is being obtained an increased tension is placed in the springs, as above described, to meet the heavier demands upon them.

*Locking the item-trains during the printing operation.*—124 indicates a shaft extending across the machine, which shaft carries two curved arms 125, in whose ends is mounted a centering-bar 126, designed to coöperate with the teeth of the gears 38$^a$. The end of shaft 124 carries a rock-arm 127, (see Fig. 7,) provided with a cam-roller fitting in a cam-groove 128 in the cam-plate 63. When the lever B is operated to place an item in the totalizers, the initial movement of said lever, as before stated, rocks the cam-plate 63, and the groove 128 is so designed as to rock the arm 127 and to cause the bar 126 to lock the gears 38$^a$ temporarily and during the initial movement of the lever B. As soon as this initial movement of lever B is completed the arm 126 is retracted from the gears and said gears are released, so that the item-trains can be restored and the items placed in the totalizers. The purpose of locking the item-trains is to hold the type-wheels rigid during the printing impression therefrom, which printing impression is taken upon the initial movement of the handle B and before the item-trains are restored and the items placed in the totalizers.

*Arresting momentum of control-bars.*—Referring to Fig. 6, 200 indicates a pin on the segment 37, which pin in the normal position of the parts registers with a recess in a collar 201, fixed to the cam-shaft 50. This collar may be conjoined to the hub of the restoring-cam 51. Each of the driving-segments 37 is provided with a pin 200, and when the handle B is manipulated to place the item in the totalizer the item-trains are restored and the notch is thrown out of registration with the pin 200, whereby the driving-segment cannot be moved beyond its home position, determined by the pin 200 becoming arrested upon the periphery of the collar 201. Likewise, as before described, the control-bars cannot be either thrown across them or arrested by the stop 32.

*Compensating for displacement by truing-wheels.*—When the lever C operates the truing star-wheels, the totalizer-trains are connected with the item-trains, and consequently the driving-segments 37 are moved forwardly beyond their home position. At this time the pin 200 registers with the recess in the collar 201 and permits of such displacement of the driving-segments. Of course the spring 34 is by this action placed under tension, and its energy is exerted in opposition to such displacement, and the item and totalizer trains might be said to be under tension, so that when the star-wheel releases the cam the spring 34 drives the meshed trains until the zero-pin is arrested by the stop 117, which determines the correct position of the totalizer-train and its meshed item-train. To permit of this, the teeth of the segments 33 and 35 have sufficient clearance to enable the driving-segment to be slightly displaced without seriously disturbing the position of the control-bar.

*Printing devices.*—Referring to Figs. 3, 6, 11, and 16, it will be observed that each of gears 38ª is provided with a cam-track 130, upon whose upper ends rest the forward ends of levers 131, pivoted upon shaft 132. The forward ends of these levers 131 are held down by means of springs 133, attached at one end to perforated projections extending from the levers 131 and at their opposite ends to a cross-bar connecting the arms 125. The rear ends of these arms 131 are provided with hooks 134, which coöperate with pins 135 on the ends of type-hammer arms 136, pivoted at 137. The arms 136 carry pins or projections 138, which coöperate with what I will term "cam projections" of disks 139, mounted upon a shaft 140.

It is obvious that if the gear 38ª is moved in the direction of the arrow the forward end of lever 131 will be raised so as to disengage the rear hooked end 134 from pin 135, thus freeing the type-hammer lever 136. Under these conditions if the disk 139 is rotated in the direction of its arrow the pin 138 will fall behind the cam projection which formerly supported it, permitting the forward end of the type-hammer lever to be drawn downwardly under the impelling action of its spring 141. The several type-hammer levers are independently operable, and each is provided with its individual spring.

The forward ends of the type-hammer levers are slotted, as at 142, in which slot is received a lateral projection extending from a type-hammer 143, said type-hammer being connected to said lever by means of a spring 144, which connection permits the type-hammer to have an independent downward movement when the type-lever reaches the limit of its throw, whereby the blow delivered by the hammer is a sharp impacting one, the spring 144 serving to restore the type-hammer to its normal position on its rebound after the blow is delivered.

*The zero character.*—As is well understood in this art, it is desirable to print zero characters to the right of an actuated train, so as to avoid the isolation of printed characters. For instance, in the event that no zero characters were printed a record made on a strip of paper would appear as follows:

```
   9 51.3
  28 . 5
  35.
  ───────
  9366.35
```

Where the zero characters are filled in at the right of an actuated train, the same example would appear as follows:

```
  9051.30
   280.05
    35.00
  ───────
  9366.35
```

It will be remembered that the item-train when operated by the keyboard sets up the item or example in the type-wheels and that the total of said items, when a total is obtained, is also set up in the same type-wheels. Under these conditions it is only necessary to control the printing of zero characters in the item-trains, both for the individual items and the total thereof. This is accomplished as follows: On each of the levers 131 is a lateral pin or projection 145. (See Figs. 6 and 11.) These pins 145 are arranged in line with each other, and the pins extend on each side of the levers 131. The upper face, or that portion of the pin which projects to the left as viewed from the front of the machine, is cut away, while the lower face, or that portion of the pin which projects to the right, is cut away. The pins thus overlap each other, as shown more clearly in Fig. 12. When any item-train is operated, if only to the extent of placing the printing character "1" in the printing-line, the coöperating lever 131 will be operated to its full extent, and all levers to the right are lifted by the pins 145, (while the levers to the left are permitted to remain stationary,) so that the zero characters to the right of the actuated printing-wheel are placed in the printing-line, and the type-hammer levers to the right are also released. As the operated item-train has operated its lever 131 and all of the levers 131 to the right thereof have been operated, it follows that all of the hooks of the operated levers 131 have released the type-hammer levers, and when the cam-disk 139 is rotated the released type-hammer levers will force their associate type-hammers down to make a printing impression not only in the column which effected the release thereof initially, but also in all columns to the right thereof to print the sero characters. The levers 131 in the "dimes" and "cents" columns are connected together, as shown in Fig. 12, in order that when a key in either of said columns is operated the zero character in the other column will be printed.

*Tripping the type-hammers.*—By referring to Fig. 7 it will be seen that the cam-plate 63 is provided with a cam-slot 146, in which operates a roller on the end of a bell-crank lever 147, the opposite end of said lever being provided with a spring-pressed pawl 148, coöperating with the teeth of a ratchet 149, fixed to the shaft which carries the cam-disks 139. The number of teeth in ratchet 149 corresponds with the number of cam projections on the disks 139.

150 indicates a spring-pressed retaining-pawl coöperating with the ratchet 149 to prevent backward rotation of said ratchet.

When the handle B is initially operated to place an item on the totalizer, the bar 126 locks the item-trains temporarily, and while said trains are so locked the bell-crank lever above described through its pawl 148 rotates the ratchet 149 a part of a revolution, so as to cause the points of the cam projections of disks 139 to ride past the pins 138 to effect a printing impression.

*Restoring the type-hammers.*—As the depression of lever B restores the control-bars and the item-trains and by such action places the item in the totalizer, I utilize this movement to reset the type-hammers and store power in their respective springs for a subsequent operation.

Referring to Fig. 8, 151 indicates a link connected at one end to the arm 54 and at its other end to a rock-arm 152, (loosely mounted upon the shaft 140.) This rock-arm 152 carries a spring-pressed pawl 153, which in the normal position of the parts is out of engagement with a tooth of a ratchet 154, which is provided with four teeth corresponding to the ratchet 149 on the opposite end of shaft 140, which has just been described. The initial movement of handle B in forcing the ratchet 149 to make a partial revolution in tripping the type-hammers causes the ratchet 154 to become engaged and locked to the pawl 153. A continued movement of handle B will in restoring the item-trains rock the arm 54 forward and through it the arm 152, which carries the spring-pressed pawl 153. When the said pawl 153 is locked to the ratchet 154, the disks 139 will be rotated to the position shown in Fig. 16 by the pawl 153, in which position the disks 139 are held by the retaining-pawl 150. When handle B is released, the pawl 148 drops behind a tooth of ratchet 149 in readiness for another operation of the hammer-tripping devices upon the initial movement of the handle B. In Fig. 4 I have shown the hammer tripping and restoring mechanism separate from the other parts of the machine in order that the same can be better understood.

*Printing the total.*—It having been explained how the items are printed, it follows that in obtaining a total the lever C is first pressed back. Then after the rod 27 is moved longitudinally to release the spring-driven item-trains to set up the total therein the handle B can be slightly depressed, so as to effect the printing of the total by imparting a partial rotation to ratchet 149. If it is desired to retain the total in the machine, lever C will be held back while lever B is depressed. If it is desired to clear the machine, lever C is released, as is also lever B, the control-bars and item-trains being restored by lever A, which in operating the arm 54 restores the type-hammers to normal position and also places their springs 141 under tension.

*Paper-feed.*—155 indicates a roll of paper mounted between suitable arms extending from the printing-head, the paper being threaded forwardly over an idler 156 and under the idlers 157 on each side of the printing-line, said paper being thence carried upwardly between the positively-driven feed-roller 158 and a spring-pressed idler 159. The feed-roller 158 is provided with a ratchet 160 at one end, (see Fig. 17,) with which ratchet coöperates a pawl 161, mounted upon a vertical sliding bar 162, (shown in dotted lines in Fig. 16,) said sliding bar having a lateral pin which coöperates with the hooked end of a lever 163. The upper end of this bar 162, which resembles a type-hammer, except that its striking-point is removed, is connected to a lever 164, pivoted at 165 to the printing-head. The rear end of this lever has a slot-and-pin connection with a lever 166, pivoted on the shaft 137, said lever extending down and being provided with a pin 167, (see Fig. 11,) which pin coöperates with a cam-disk 168 in all respects resembling the disks 139 which operate the type-hammers. By this construction whenever the type-hammers are operated the bar 162 is reciprocated, so as to drive the paper-feed roller 158.

*The inking-ribbon.*—As the reciprocation of the bar 162 vibrates the lever 163, which is mounted upon the end of a ribbon-spool 169, I mount a pawl 170 on one end of said lever 163, which pawl engages the ratchet-wheel connected with the ribbon-spool and draws the ribbon 171 over the face of the type, said ribbon being fed from a spool 172. Of course the ribbon is located between the type and the paper, the type-hammers forcing the paper against the printing-type, so as to take an impression from the ribbon.

*Releasing the latch-plates.*—In describing the keyboard I referred to a rocking bar 23, which carries pawls 22, the said pawls locking the latch-plates in an abnormal position. I did not, however, describe how this bar 23 was rocked to release the latch-plates and permit them to return to normal position upon the restoration of the control-bars. By referring to Fig. 15 it will be seen that the shaft 50 carries a cam 173, said cam having fluctuations on opposite sides, as shown more clearly in Fig. 27, between which fluctuations are concentric portions. Straddling this cam is a yoke 174, which yoke is pivoted upon a shaft 175, so that when the shaft 50 is rocked to restore the item-trains the yoke will be vibrated.

176 indicates a pin or projection carried by the yoke, which fits in a slot in an arm 177, the axis of movement of said arm being coincident with the axis of movement of the bar 23, to which said arm is fixed. (See Figs. 10 and 11.) By the above construction whenever the shaft 50 is rocked to restore the control-bars the bar 23 is likewise rocked, so as to release the latch-plates and permit the zero-posts carried thereby to move under the front ends of the control-bars.

My purpose in reserving the description of this construction until the present is to bring out more clearly the relation of this latch-plate release to the repeating or multiplying mechanism about to be described.

*Repeating or multiplying mechanism.*—It is obvious that if the bar 23 is operated at each operation of shaft 50 (which is operable by the levers A and B) any example set up on the keyboard will remain there during one operation of either of said levers. However, in repeating examples, as in sums of addition or multiplication, it is necessary after setting up an example in the keyboard to keep the same in the keyboard, so that continued operations of the handle B will place the item a number of times in the totalizer.

Multiplication, as is well known, is but a form of addition. For instance, if "327" is to be multiplied by "289" the example "327" can be set up on the keyboard and by retaining the same in the keyboard until nine operations of the lever B have been effected the sum or total in the totalizer will be equivalent to multiplying "327" by "9." To multiply the same number by "8" of the multiplier "289," as eight is in the "tens-column" the multiplicand is set up on the keyboard, not, however, as three hundred and twenty-seven units, but as three hundred and twenty-seven tens—to wit, "3270." Such an item is placed in the totalizer eight times. To multiply by the numeral "2" in the multiplier "289," the multiplicand is again set upon the keyboard as "32700," and such an item is placed in the totalizer twice. The result in obtaining the total will be "94503." To accomplish this repeating of an example, I provide means for preventing the bar 23 from being operated at each operation of the shaft 50 and also provide means whereby upon the conclusion of a certain number of operations of shaft 50 the bar 23 will be automatically connected thereto, so as to be released at the end of a given number of operations of shaft 50. This mechanism is shown in Figs. 26 and 27.

The shaft 175 referred to is longitudinally movable against the action of a spring $175^a$. This shaft carries a ratchet-wheel 178, upon which are arranged pins 179, said pins in the normal position of the shaft being received in openings in the frame-plate. When the pins are out of their openings, the yoke 174 is displaced laterally with respect to its cam 173 and will not be operated by said cam. When the pins are in the openings, however, the yoke will be operated and the bar 23 actuated.

180 indicates a dial, (see Fig. 1,) which is exhibited through the side casing of the machine, said dial being provided with a scale for coöperating with a pointer 182. Upon pulling the knob 183 outwardly, so as to remove the pins 179 from their openings, the dial may be rotated to any number, in this instance under fifty, so as to insure a greater or less distance of travel of the pins 179 before reaching their respective openings.

Coöperating with the ratchet 178 is a spring-pressed pawl 184, mounted upon an arm 185, connected by a link 186 to the cam-plate 63. (See Fig. 7.) Whenever the lever B is operated, the pawl 184 is moved inwardly, and if the ratchet-wheel 178 is in its path said ratchet-wheel will be rotated the distance of one tooth at every operation of the lever B. Depending upon the number of times it is desired to repeat the item in the totalizer the dial is so adjusted, and upon the completion of the required number of strokes the pins 179 drop into their openings and the ratchet-wheel is moved out of the path of the pawl 184, so that subsequent operations of the lever B will be idle so far as the ratchet-wheel 178 is concerned. When the pins 179 drop into their openings, the yoke 174 instantly becomes operative; but when the pins are out of their openings the ratchet-wheel is in the path of movement of the pawl 184 and the yoke is inoperative.

*Temporary support for control-bars.*—In operating the repeating device it is obvious that in manipulating the lever B said lever at each operation restores the control-bars to normal position and likewise the item-trains, which item-trains place the items in the totalizer-trains. As the bar 23 holds the operated latch-plates in an abnormal position, the control-bars have a tendency to follow the restoring-cams 51, which tendency would, if means were not provided to prevent it, reversely rotate the totalizer-trains before the item-trains are disconnected therefrom in readiness to be again set in the repetition of the example. I have therefore provided what I have termed a "temporary support" for the control-bars, which support is effective in holding the control-bars in an elevated position until the item-trains, after placing an item in the totalizer-trains, have become disconnected from the totalizer-trains, so that the next item which is repeated in the keyboard and which drives the item-trains by the spring-motors will not interfere with the totalizer-trains, the totalizer-trains being thus given ample time to clear the driving-segments 37 before the item is repeated in the keyboard.

Referring to Fig. 7, 187 is an arm projecting from the cam-plate 63, to which it is fixed, to which arm is connected a rod 188. This rod, as shown in Fig. 10, extends to the front end of the keyboard, where it is connected above the pivotal point to a rod 190. This rod has a rocking frame 191 mounted thereon, said frame being normally held by a spring 192 inwardly against a fixed projection 193 extending from the rod 190.

At every operation of the operating-lever B the fixed projection 193 is rocked inwardly, and should the end of the control-bar be in the path of the spring-pressed frame 191 it will arrest the inward movement of said frame. However, when the control-bars are restored the spring-pressed frame 191 will move under the forward ends of the control-bars, supporting them until the zero-posts 20 move into position, or if the item is being repeated in the machine the control-bars will be held elevated by the spring-pressed frame 191 until the final return movement of the handle B, when through the rod 188 the fixed projection 193 will carry the spring-pressed frame 191 from under the control-bars. By this time the totalizer-trains have become disengaged from the driving-segments 37, and the subsequent operation of the item-trains by the descending control-bars will repeat the item in the item-trains.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In a machine of the character described, the combination with a series of independently-depressible keys, a rockable stop operated by each key, a pivoted latch-plate common to all of said stops, and a stepped control-bar coöperating with said stops; substantially as described.

2. In a machine of the character described, the combination with a series of independently-depressible keys, of a rockable stop for each key, and a pivoted latch-plate common to said series of stops, means for holding the latch-plate in locked position after the same has been operated by a key-stop, and a stepped control-bar coöperating with said stops; substantially as described.

3. In a machine of the character described, the combination with a series of independently-depressible keys, a stop in the form of a bell-crank lever operated by each key, a pivoted latch-plate common to said stops, means on each key-stop for engaging and holding the latch-plate in an abnormal position after operation, and a control-bar coöperating with said stops; substantially as described.

4. In a machine of the character described, the combination with a series of independently-depressible keys, a stop for each key in the form of a bell-crank lever having a hook at its upper end, a latch-plate common to said series of stops, said latch-plate coöperating with said hooked end of the key-stop, and a control-bar coöperating with said stops; substantially as described.

5. In a machine of the character described, the combination with a series of independently-depressible keys, a rockable stop for each key, a spring connected to each stop for returning the same to normal position elevating the key, and a pivoted latch-plate common to said series of stops, and a control-bar coöperating with said stops; substantially as described.

6. In a machine of the character described, the combination with a series of independently-depressible keys, of a stop in the form of a bell-crank lever operated by each key, a pivoted latch-plate common to said stops, means for engaging and holding the latch-plate in an abnormal position after operation to lock the key-stop against return, and a control-bar coöperating with said stops; substantially as described.

7. In a machine of the character described, the combination with a series of independently-depressible keys, a stop in the form of a bell-crank lever operated by each key, a pivoted latch-plate common to said stops, means on each key-stop for engaging and holding the latch-plate in an abnormal position after operation, means for locking the latch-plate in said abnormal position to prevent the return of the key-stop, and a control-bar coöperating with said stops; substantially as described.

8. In a machine of the character described, the combination with a series of independently-depressible keys, a stop connected to and operated by each key, said stop being in the form of a bell-crank lever and having a hook at its upper end, a latch-plate common to said series of stops, said latch-plate engaging the stop-hook and locking the key in a depressed position after operation, means for holding the latch-plate in an abnormal position, and a control-bar coöperating with said stops; substantially as described.

9. In a machine of the character described, the combination with a series of independently-depressible keys, of a stop for each key comprising a bell-crank lever whose horizontal member engages its coöperating key-shank, and whose vertical member is provided with a hook portion and a shouldered upper end, a control-bar which coöperates with the shouldered upper end, a latch-plate which coöperates with the hook end of said stop, and a control-bar coöperating with said stops; substantially as described.

10. In a machine of the character described, the combination with series of depressible keys, of rockable stops for each key, latch-plates common to stops of each series of keys, pawls coöperating with said latch-plates, a rocking carrier for said pawls, and a stepped control-bar coöperating with said stops; substantially as described.

11. In a machine of the character described, the combination with a plurality of series of keys, of stops controlled by each key, latch-plates common to all the stops of each series of keys, a pawl for each latch-plate, a rocking bar carrying said pawls, a spring connected to each latch-plate for normally holding it out of engagement with its pawl, means for rocking the pawl-carrying bar to release the latch-plates, and a control-bar coöperating with said stops; substantially as described.

12. In a machine of the character described, the combination with a key, a pivoted stop operated thereby, a latch coöperating with said stop, said latch being pivoted at a different point, whereby its arc of movement is different from that of the key-stop, and a stepped control-bar coöperating with said stop; substantially as described.

13. In a machine of the character described, the combination with a key, of a pivoted stop operated thereby, a latch coöperating with said stop and pivoted on a different center, means for locking said latch and key-stop together upon the operation of the key, and a stepped control-bar coöperating with said stop; substantially as described.

14. In a machine of the character described, the combination with a key, of a pivoted stop operated thereby, a hook carried by said stop, a latch pivoted on a different center and designed to coöperate with the stop-hook, means for holding said latch and key-stop in a locked position, and a stepped control-bar coöperating with said stop; substantially as described.

15. In a machine of the character described, the combination with a series of keys, of a series of independently-operable pivoted stops, a latch-plate common to said series of stops, said latch-plate having an axis rotation different from the axis of movement of said key-stops, means for locking an operated key-stop to the latch-plate, said means holding said parts in an abnormal position, means for preventing the engagement of any other key-stop with the latch-plate during the engagement between one of said key-stops and said latch-plate, and a control-bar coöperating with said stops; substantially as described.

16. In a machine of the character described, the combination with a series of keys, of independent stops operated thereby, said stops being pivotally mounted, a latch-plate having an arc of movement different from the stop, whereby, when any of said key-stops is operated the latch-plate is rocked, so as to become locked with the operated key-stop, means for holding said latch-plate in its rocked position, and a control-bar coöperating with said stops; substantially as described, 17. In a machine of the character described, the combination with a series of keys, of independently-operable pivoted stops having hooks at their upper ends, a latch-plate having an arc of movement different from the key-stops, and being designed to be operated by any of said key stops, said latch-plate being locked to the operating key-stop in an abnormal position, whereby, the hook end of other key-stops cannot engage the latch-plate, means for holding said latch-plate in such abnormal position, and a control-bar coöperating with said stops; substantially as described.

18. In a machine of the character described, the combination with a series of keys and their pivoted stops, of a latch-plate having an arc of movement different from said stops, means whereby the latch-plate becomes locked to an operated key-stop, a pawl for holding the latch-plate in an abnormal position, a spring for returning the latch-plate to normal position, means for operating the pawl to release said latch-plate, and a control-bar coöperating with said stops; substantially as described.

19. In a machine of the character described, the combination with a series of keys, of key-stops operated thereby, a latch-plate for locking the operated key-stop in an abnormal position, a stepped control-bar which is arrested by the operated key-stop, and a spring for driving said control-bar to its adjusted position; substantially as described.

20. In a machine of the character described, the combination with a series of keys and their key-stops, a control-bar movable in a path alongside of said key-stops, and a latch-plate coöperating with the key-stops and operated on the side of the path of movement opposite the key-stops; substantially as described.

21. In a machine of the character described, the combination with a control-bar, of a series of key-stops arranged along one side of its path of movement, and a latch-plate common to said series of key-stops and arranged on the other side of the path of movement of said control-bar, whereby said control-bar can operate in the space between said key-stop and said latch-plate; substantially as described.

22. In a machine of the character described, the combination with a control-bar, of a series of key-stops arranged along one side of its path of movement, a latch-plate common to said series of key-stops and arranged on the other side of the path of movement of said control-bar, and means for moving one of the key-stops into engagement with the latch-plate and into the path of the control-bar, said means simultaneously releasing the control-bar and permitting its descent onto the actuated key-stop; substantially as described.

23. In a machine of the character indicated, the combination with a series of keys and their stops, of a latch-plate common to all of said stops, means for holding said latch-plate in an abnormal position, a control-bar coöperating with said stops, an item-train which is driven by said control-bar, and means for restoring said item-train and control-bar to normal position, said means also effecting the release of the latch-plate whereby the key is permitted to rise; substantially as described.

24. In a machine of the character described, the combination with a series of keys and their stops, of a latch-plate common to said stops, a pawl for holding said latch-plate in an abnormal position and locking the key-stop thereto, a control-bar coöperating with said key-stops, an item-train which is driven by said control-bar, means for restoring the item-train to zero position, said restoring means also operating the pawl to release the latch-plate; substantially as described.

25. In a machine of the character indicated, the combination with a series of keys and their stops, of a latch-plate carrying a zero-post and designed to be operated by any of said key-stops, and a control-bar which is held in an elevated position by said zero-post, whereby when the latch-plate is operated by a key-stop the zero-post is laterally displaced to permit the control-bar to drop onto the actuated stop in its path; substantially as described.

26. In a machine of the character indicated, the combination with a latch-plate carrying a zero-post and a detaining-wing, of a control-bar normally supported by said post, a series of keys, pivoted stops connected to and operated by their respective keys, said stops, when actuated, engaging the latch-plate and moving it laterally so as to displace the zero-post and permit the control-bar to fall onto the actuated stop, and a pawl which coöperates with the detaining-wing upon the operation of the latch-plate, to hold said latch-plate in an abnormal position; substantially as described.

27. In a machine of the character indicated, the combination with a pivoted latch-plate, means for yieldingly holding the same in normal position, a zero-post and a detaining-wing carried by said latch-plate, a control-bar normally supported by the zero-post, a series of independently-operable keys, a pivoted stop for each key, said stop being in the form of a bell-crank lever and having a hook at its upper end for engaging the latch-plate, the upper ends of the stops being normally out of the path of the control-bar, a spring for each stop for returning the same and its connected key to normal position, and a pawl for coöperating with the detaining-wing; substantially as described.

28. In a machine of the character indicated, the combination with a series of keys and their stops, of a latch-plate common thereto, a pawl for coöperating with said latch-plate, a pivoted bar upon which said pawl is mounted, a rock-arm connected to said bar, and a cam for operating said rock-arm to swing the pawl-carrying bar on its pivot, whereby the latch-plate is released; substantially as described.

29. In a machine of the character described, the combination with latch-plates, of detaining-pawls for locking the same in abnormal positions, a rockable pawl-carrier, and a cam operated by the restoring devices for actuating said pawl-carrier; substantially as described.

30. In a machine of the character described, the combination with pivoted latch-plates, of detaining-pawls therefor, a rockable pawl-carrier, a cam, a yoke-lever operated by said cam, and a connection between said yoke and said rockable pawl-carrier; substantially as described.

31. In a machine of the character described, the combination with pivoted latch-plates, of detaining-pawls therefor, a rockable pawl-carrier, a cam for operating said pawl-carrier, and means for rendering said cam inoperative; substantially as described.

32. In a machine of the character described, the combination with a series of pivoted latch-plates, of a pawl-carrier having detaining-pawls therefor, a rock-arm extending from said pawl-carrier, a yoke-lever coöperating with said rock-arm, and a cam having oppositely-placed fluctuations and concentric portions for coöperating with said yoke-lever; substantially as described.

33. In a machine of the character described, the combination with a plurality of series of keys and their laterally-movable stops, of vertically-movable control-bars, pivoted latch-plates for each series, said latch-plates coöperating with said stops and said control-bars, and means for operating all of said plates simultaneously; substantially as described.

34. In a machine of the character described, the combination with a plurality of series of keys and their stops, of control-bars common to the key-stops of a series, pivoted latch-plates coöperating with each series of key-stops for normally supporting the control-bars in an elevated position, and means for simultaneously operating said latch-plates, whereby the control-bars are permitted to descend independently of the operation of a key in the series; substantially as described.

35. In a machine of the character described, the combination with a plurality of series of keys and their stops, of latch-plates coöperating with said stops, control-bars supported in an elevated position by said latch-plates, and a rod 27 capable of being rotated and moved longitudinally, said rod carrying means for engaging and operating all of said latch-plates simultaneously; substantially as described.

36. In a machine of the character indicated, the combination with a keyboard comprising a plurality of series of keys, of key-stops operable by each key, control-bars common to each series of keys and coöperating with the stops thereof, pivoted latch-plates also coöperating with the key-stops, means for locking the latch-plates in an operative position, item-trains which are driven by the control-bars, and means for restoring said item-trains to zero position, said restoring means also restoring the control-bars and releasing the pivoted latch-plates; substantially as described.

37. In a machine of the character described, the combination with a keyboard comprising a plurality of series of keys, of stops operable by said keys, control-bars coöperating with the stops of a series of keys, latch-plates also coöperating with the stops of a series of keys, said latch-plates normally holding the control-bars in an elevated position, and means for operating all of said latch-plates to release all of said control-bars independently of the movement of any key, said means being inoperative whenever any of said latch-plates is in other than normal position; substantially as described.

38. In a machine of the character described, the combination with a keyboard comprising a plurality of series of keys, control-bars and latch-plates common to a series of keys, said control-bars being normally held in an elevated position by said latch-plates, and means for moving all of said latch-plates simultaneously to release all of said control-bars, said means being inoperative if any key in the keyboard is depressed; substantially as described.

39. In a machine of the character described, the combination with a keyboard comprising a plurality of series of keys, of latch-plates and control-bars common to a series of keys, said latch-plates normally holding said control-bars in an elevated position, a longitudinally-movable rod extending transversely the keyboard and provided with projections for engaging all of said latch-plates in normal position, said projections, if any latch-plate is in other than a normal position, preventing said rod being operated to release the latch-plates in normal position; substantially as described.

40. In a machine of the character described, the combination with a series of keys, of a stop operable by each key, a pivoted latch-plate coöperating with said series of stops, a detaining-wing on said latch-plate, a pawl coöperating with said detaining-wing, and a rockable pawl-carrier; substantially as described.

41. In a machine of the character described, the combination with a latch-plate, of a series of keys and their stops coöperating therewith, a recessed lateral projection carried by the latch-plate, means for engaging said recessed projection and operating the latch-plate independently of the key-stops; substantially as described.

42. In a machine of the character described, the combination with a pivoted latch-plate having a lateral projection, of key-stops designed to coöperate with said latch-plate and swing the same on its pivot, and means coöperating with said lateral projection to operate the latch-plate independently of the key-stops; substantially as described.

43. In a machine of the character described, the combination with a series of pivoted latch-plates having recessed lateral projections, of key-stops coöperating with said latch-plates, and arms 29 normally in register with the recesses in said lateral projections for swinging the latch-plates independently of the key-stops; substantially as described.

44. In a machine of the character described, the combination with a series of pivoted latch-plates, each of which is provided with a recessed lateral projection, of key-stops coöperating with said latch-plates, arms 29 which normally register with the recesses in said lateral projections, and means which becomes effective upon the operation of any key-stop for preventing the arms 29 from engaging said recesses; substantially as described.

45. In a machine of the character described, the combination with a series of latch-plates having recessed projections, of a rock-shaft having arms registering with said recesses, and means for rocking said shaft so as to cause said arms to engage said recesses; substantially as described.

46. In a machine of the character described, the combination with a series of latch-plates having recessed projections, of a longitudinally-movable rock-shaft having arms registering with said recessed projections when the latch-plates are in normal position, and means for rocking said shaft to engage said arms in said recesses whereby, when the shaft is moved longitudinally, all of the latch-plates will be simultaneously operated; substantially as described.

47. In a machine of the character described, the combination with control-bars, of latch-plates for supporting the same, recessed projections on said latch-plates, a longitudinally-movable rock-shaft having arms registering with the recesses in said projections, means for rocking said shaft to engage the arms in said recesses, whereby, when said shaft is moved longitudinally all of the latch-plates will be operated and the control-bars tripped, and a spring connected to said shaft to restore the same to normal position; substantially as described.

48. In a machine of the character described, the combination with a series of keys and their stops, of a control-bar common thereto and having a series of steps on its lower edge, a spring connected to said control-bar for forcing the same downward onto any one of said stops, a segmental gear connected to said control-bar, and an item-train normally in mesh with said gear; substantially as described.

49. In a machine of the character described, the combination with a series of keys and their stops, of a control-bar normally held in an elevated position above said stops, said control-bar having a series of steps on its lower edge, a spring connected to said control-bar for forcing the same downward, means for tripping said control-bar and permitting its downward movement upon the actuation of any key of said series, an item-train driven by said control-bar, and means for restoring said item-train to zero position and elevating said control-bar, said means also resetting the trip for the control-bar; substantially as described.

50. In a machine of the character described, the combination with a keyboard and spring-impelled control-bars coöperating therewith, of segmental gears connected to said control-bars, item-trains constantly in mesh with said segmental gears, said item-trains including sight and printing wheels, means for restoring the item-trains and control-bars to normal position, and devices for centering and locking the printing-wheels, said devices being temporarily effective upon the initial movement of the restoring means; substantially as described.

51. In a machine of the character described, the combination with a keyboard and spring-impelled control-bars, of segmental gears connected to said control-bars, item-trains constantly in mesh with said gears, sight and printing wheels which are driven by the item-trains, centering-disks in said item-trains, and a bar for coöperating with said centering-disks; substantially as described.

52. In a machine of the character described, the combination with item-trains and their means of actuation, of restoring mechanism therefor, and means for temporarily locking said trains against movement, said locking means being effective only at the initial movement of the restoring mechanism; substantially as described.

53. In a machine of the character described, the combination with item-trains and means for operating the same, of a locking device for all of said item-trains, a restoring mechanism for the item-trains, and a connection between said restoring mechanism and said locking device which is effective only upon the initial movement of the former; substantially as described.

54. In a machine of the character described, the combination with item-trains and their means of operation, of a hand-lever for restoring the same, a rocking frame containing totalizer-trains, and a connection between said hand-lever and said rocking frame, whereby, after the hand-lever has been initially moved and before the return movement thereof, the totalizer-frame is rocked to connect its carried trains with the driving mechanism for the item-trains; substantially as described.

55. In a machine of the character described, the combination with control-bars, of driving-segments operated thereby, gears in mesh with said driving-segments, a group of gears $38^a$, intermediate pinions for transmitting motion to said group of gears, and item-indicating wheels in mesh with said gears $38^a$; substantially as described.

56. In a machine of the character described, the combination with control-bars, of driving-segments operated thereby, gears in mesh with said driving-segments, a group of gears $38^a$, intermediate pinions for transmitting motion to said group of gears, and item-printing wheels in mesh with said gears $38^a$; substantially as described.

57. In a machine of the character described, the combination with control-bars, of driving-segments operated thereby, gears in mesh with said driving-segments, a group of gears $38^a$, intermediate pinions for transmitting motion to said group of gears, item-indicating wheels in mesh with said gears $38^a$, and item-printing wheels in mesh with said gears $38^a$; substantially as described.

58. In a machine of the character described, the combination with control-bars, of key-stops for arresting the same in a predetermined position, and a rock-shaft carrying a series of restoring-cams normally out of engagement with the control-bars, whereby the rock-shaft has an initial idle movement before the restoring-cams engage the control-bars; substantially as described.

59. In a machine of the character described, the combination with control-bars, of key-stops for arresting the same in predetermined positions, lateral projections on said control-bars, restoring-cams coöperating with said lateral projections, and means for recovering said restoring cams and moving them from under said lateral projections; substantially as described.

60. In a machine of the character described, the combination with pivoted control-bars having lateral projections near their pivotal points, of key-stops for arresting the control-bars in predetermined positions, a rock-shaft, restoring-cams on said rock-shaft for coöperating with the lateral projections on said control-bars, said rock-shaft having an initial idle movement before its restoring-cams become engaged with said lateral projections, and a spring for retracting said restoring-cams and placing them out of the paths of said lateral projections after operation; substantially as described.

61. In a machine of the character described, the combination with control-bars, of stops for arresting them in predetermined positions, a rock-shaft carrying restoring devices for said bars, and two handles loosely mounted on said rock-shaft for rocking the same; substantially as described.

62. In a machine of the character described, the combination with control-bars, of key-stops for arresting them in predetermined positions, a rock-shaft carrying restoring devices for said bars, an arm fixed to said rock-shaft, and a handle loosely mounted on said rock-shaft and designed to engage and operate the same through said arm; substantially as described.

63. In a machine of the character described, the combination with control-bars, of key-stops for arresting them in predetermined positions, a rock-shaft having restoring devices for said bars, an arm fixed upon said rock-shaft, a lever or handle A loosely mounted on said rock-shaft, and designed to operate said shaft through said arm, and a spring for holding said handle against a stationary projection, whereby said shaft can be manipulated independent of any movement of said handle; substantially as described.

64. In a machine of the character described, the combination with control-bars, of key-stops for arresting them in predetermined positions, a rock-shaft having restoring devices for said bars, two arms 54 and 58 fixed to said rock-shaft, two handles A and B loosely mounted upon said rock-shaft, and means for connecting said handles to said rock-shaft, whereby the handle B is permitted to have an initial movement before becoming engaged with the rock-shaft; substantially as described.

65. In a machine of the character described, the combination with control-bars, of key-stops for arresting them in predetermined positions, a rock-shaft having restoring devices for said bars, a handle B loosely mounted upon said rock-shaft, a cam-plate 60 carried by said handle and provided with a pin or projection 59, and an arm 58 fixed to the rock-shaft which is designed to be operated by said pin or projection upon the operation of said handle B; substantially as described.

66. In a machine of the character described, the combination with control-bars, of key-stops therefor, item-trains, restoring devices for said control-bars, a handle for operating said restoring devices, a cam-plate 60, provided with a cam-slot 61 operated by said handle, and means operated by said cam-plate for engaging the totalizer-trains with the item-trains before the control-bars are restored; substantially as described.

67. In a machine of the character described, the combination with control-bars, of key-stops therefor, item-trains driven by said control-bars, totalizer-trains normally disconnected from the driving mechanism for the item-trains, a handle for restoring the item-trains, a cam-plate operated by said handle, means operated by the cam-plate to connect the totalizer-trains with the driving mechanism for the item-trains, and means operated by said cam-plate for effecting the printing of the items before the totalizer-trains are connected with the driving mechanism for the item-trains; substantially as described.

68. In a machine of the character described, the combination with item and totalizer trains and restoring devices for the item-trains, driving mechanism for the item-trains, of a handle for operating said restoring devices, said handle operating a cam-plate having a cam-slot, a lever operated from said cam-slot, and means connected to said lever for effecting the connection of the totalizer-trains with the driving mechanism for the item-trains before the handle restores the item-trains; substantially as described.

69. In a machine of the character described, the combination with item and totalizer trains, of driving mechanism for the item-trains, restoring devices for the item-trains, a handle for operating said restoring devices, a cam-plate operated by said handle, said cam-plate having a cam-slot, and a lever 63 which is operated by said cam-slot, said lever effecting a connection between the totalizer and the driving mechanism for the item-trains after the handle is given an initial movement, said lever also holding the totalizer-trains and the driving mechanism for the item-trains connected while the handle is restoring the item-trains to zero position; substantially as described.

70. In a machine of the character described, the combination with item and totalizer trains, of printing devices in the form of spring-impelled type-hammers, a handle for restoring the item-trains and placing the items in the totalizer, said handle having an initial movement which trips the type-hammers and effects the printing of the items before the restoring devices are operated, means operated by said handle for resetting the type-hammers after operation and means for preventing the operation of all the type-hammers not identified with an actuated item-train; substantially as described.

71. In a machine of the character described, the combination with item-trains and their means of operation, of totalizer-trains mounted in pivoted frame-plates, a cam-roller extending from one of said frame-plates, a lever provided with an L-shaped cam-slot for receiving said roller, a handle for operating said lever to rock said totalizer-frame, and means for rocking said totalizer-frame independently of said handle; substantially as described.

72. In a machine of the character described, the combination with item-trains and their means of operation, of totalizer-trains mounted in pivoted frame-plates, a cam-roller extending from one of said frame-plates, a lever provided with an L-shaped cam-slot for receiving said roller, whereby lost motion is permitted between the initial movement of the said lever and the said totalizer-frame, a handle for operating said lever to rock the totalizer-frame, and a total-lever for rocking the totalizer-frame independently of said handle and slotted lever; substantially as described.

73. In a machine of the character described, the combination with totalizer-trains, of a rock-shaft carrying locking devices designed to coöperate with said trains, a rock-arm on said shaft, a lever 77 for operating said rock-arm, item-trains, means for restoring said item-trains, and a cam driven by said restoring means to operate said lever 77; substantially as described.

74. In a machine of the character described, the combination with totalizer-trains, of a rock-shaft carrying locking devices therefor, a rock-arm on said shaft, a lever 77 coöperating with said rock-arm, a cam-track 80 for operating said lever, and restoring mechanism for the item-trains with which said cam-track is identified; substantially as described.

75. In a machine of the character described, the combination with item-trains and their driving means, of a rock-shaft carrying restoring mechanism therefor, a rock-arm 54 provided with a cam-track extension, said arm being mounted upon said rock-shaft, totalizer-trains normally disconnected from the driving mechanism for the item-trains, locking devices for said totalizer-trains which are operative when said totalizer-trains are disconnected from said driving mechanism for the item-trains, and means for effecting a connection between said totalizer-trains and the driving mechanism for the item-trains, said means also restoring the item-trains and through said cam-track 80 unlocking the totalizer-trains; substantially as described.

76. In a machine of the character described, the combination with item-trains and their driving mechanism, of totalizer-trains normally disconnected therefrom, a lock for said totalizer-trains which is operative when the totalizer-trains are disconnected from the driving mechanism for the item-trains, means for restoring the item-trains and coincidently therewith operating said lock, and means independent of said restoring mechanism for effecting a connection between the totalizer-trains and the driving mechanism for the item-trains and operating said lock; substantially as described.

77. In a machine of the character described, the combination with item-trains, of driving-segments therefor, spring-impelled control-bars for operating said driving-segments, a keyboard for setting up stops to control the position of said control-bars and driving-segments, said control-bars and said driving-segments being pivoted at different points, and a connection between the two; substantially as described.

78. In a machine of the character described, the combination with item-trains and totalizer-trains, of a driving-segment therefor, said segment being mounted upon a shaft 36, a control-bar mounted upon a shaft 34, and means connecting said control-bar and driving-segment whereby motion imparted to one is reversed in the other; substantially as described.

79. In a machine of the character described, the combination with an item-train, of a driving-segment therefor, said segment being mounted upon a shaft 36 and having a toothed segment of smaller diameter conjoined thereto, and a control-bar mounted upon said shaft 34 and having a toothed segment 33 conjoined thereto and in mesh with a segment 35; substantially as described.

80. In a calculating-machine, the combination with totalizer-trains, of independently-operable differential means for driving said totalizer-trains, keys for determining the distance of movement of said differential driving means depending upon the position of the key operated, and an escapement mechanism operated by a train of lower order for driving an element in the next adjacent train of higher order when said element is in action in the normal operation of the machine; substantially as described.

81. In a calculating-machine, the combination with totalizer-trains, of independently-operable differential means for driving said totalizer-trains, keys for determining the distance of movement of said differential driving means depending upon the position of the key operated, and an escapement mechanism operated by a train of lower order for driving an element in the next adjacent train of higher order when said element is locked against movement in the normal operation of the machine; substantially as described.

82. In a calculating-machine, the combination with totalizer-trains, of independently-operable differential means for driving said totalizer-trains, keys for determining the distance of movement of said differential driving means depending upon the position of the key operated, and an escapement mechanism operated by a train of lower order for driving an element in the next adjacent train of higher order when said element is in action or locked against movement in the normal operation of the machine; substantially as described.

83. In a machine of the character described, the combination with independently-driven totalizer-trains, of independently-operable differential driving means for said totalizer-trains, keys for determining the distance of movement of said driving means, a vibrating element operated from one of said trains for positively reciprocating an element in the next adjacent train of higher order, when said train of higher order is at rest, or is being driven by its individual driving means, and means for converting said reciprocatory motion into a rotary motion in said train of higher order; substantially as described.

84. In a machine of the character described, the combination with independently-operable totalizer-trains, of independently-operable differential driving means for said totalizer-trains, keys for determining the distance of movement of said driving means, a vibrating element operated by one of said trains, a reciprocating element in the next adjacent train of higher order and which is operated by said vibrating element, and means for converting the reciprocatory motion of said element into an advancing rotary motion in the train in which it is located; substantially as described.

85. In a machine of the character described, the combination with independently-operable totalizer-trains, of independently-operable differential driving means for said totalizer-trains, keys for determining the distance of movement of said driving means, a vibrating element operated by one of said trains, a reciprocating element in the next adjacent train of higher order and which is operated by said vibrating element, and means for converting the reciprocatory motion of said element into an advancing rotary motion in the train in which it is located, whereby said train may be driven by its ordinary driving means, and by said reciprocatory element, either motion being imparted thereto simultaneously or dissimultaneously; substantially as described.

86. In a machine of the character described, the combination with independently-operable totalizer-trains, of item-trains for controlling the movement thereof, of independently-operable differential driving means for said totalizer-trains, keys for determining the distance of movement of said driving means, a vibrating element identified with the totalizer-train of lower order, a reciprocating element identified with the totalizer-train of higher order, and which reciprocating element is operated by said vibrating element, and means for advancing the totalizer-train of higher order by the reciprocations of said element only while the total-train of higher order is connected with its item-train; substantially as described.

87. In a calculating-machine, the combination with totalizer-trains, of independently-operable differential driving means for said totalizer-trains, keys for determining the distance of movement of said driving means, connections between said trains, and means operated by a train of lower order for positively driving the next adjacent train of higher order independently of the movement imparted to said train of higher order in the ordinary operation of the machine; substantially as described.

88. In a calculating-machine, the combination with totalizer-trains, of independently-operable differential driving means for said totalizer-trains, keys for determining the distance of movement of said driving means, continual connections between said trains, and means operated by a train of lower order for positively driving an element in the next adjacent train of higher order at intervals of motion in the train of lower order and during the action of the said element in the normal operation of the machine; substantially as described.

89. In a machine of the character described, the combination with totalizer-trains, of differential means for independently driving the same, keys for controlling said differential means, a vibratory connection between said trains for intermittently advancing the train of higher order positively from the movement of the train of lower order when said train of higher order is at rest, or is being driven by its individual driving means; substantially as described.

90. In a machine of the character described, the combination with totalizer-trains, of differential means for independently driving the same, keys for controlling said differential means, a vibratory connection between said trains, a coupling in the train of higher order which is operated by said connection, and means in the train of lower order for operating said connection intermittently, whereby said coupling is operated to advance the train of higher order; substantially as described.

91. In a machine of the character described, the combination with two constantly-connected but independently-driven totalizer-trains, of independently-operable differential driving means for said totalizer-trains, keys for determining the distance of movement of said driving means, and vibratory means in the train of lower order for operating said connection to advance the train of higher order when said train of higher order is at rest, or is being driven by its individual driving means; substantially as described.

92. In a machine of the character described, the combination with a series of totalizer-trains, of differential means for independently driving them, keys for controlling said differential means, vibratory connections between all of said trains, and means in said trains for operating said connections to effect a relative movement between the elements of the next adjacent train of higher order when said train of higher order is at rest, or is being driven by its individual driving means; substantially as described.

93. In a machine of the character described, the combination with a series of totalizer-trains, of differential means for independently driving them, keys for controlling said differential means, vibratory connections between all of said trains, means in said trains for operating said connections to effect a relative movement between the elements of the next adjacent train of higher order when said train of higher order is at rest, or is being driven by its individual driving means, and means for preventing an erratic shifting of said trains; substantially as described.

94. In a machine of the character described, the combination with a series of totalizer-trains, of differential means for independently operating them, keys for controlling said differential means, vibratory connections between said trains, and means in said trains for operating said connections for effecting a relative movement between the elements of the next adjacent train in advance, whereby one portion of said train will be advanced beyond the other; substantially as described.

95. In a machine of the character described, the combination with a series of totalizer-trains, of differential means for independently driving them, keys for controlling said differential means, vibratory connections between said trains, and means in said trains for operating said connections whereby the next adjacent train in advance is driven independently of its individual driving mechanism; substantially as described.

96. In a machine of the character described, the combination with a series of totalizer-trains, of independent operable differential driving means for said totalizer-trains, keys for determining the distance of movement of said driving means, coupled transmitting-gears for conveying motion to said trains, and means operated by the next adjacent train of lower order to advance one of the coupled transmitting-gears; substantially as described.

97. In a machine of the character described, the combination with a series of totalizer-trains, of independent operable differential driving means for said totalizer-trains, keys for determining the distance of movement of said driving means, transmitting-gears for driving the same, said transmitting-gears being normally locked together, and means operated by the totalizer-train of lower order for effecting a relative movement between said coupled transmitting-gears; substantially as described.

98. In a machine of the character described, the combination with a series of totalizer-trains, of independent operable differential driving means for said totalizer-trains, keys for determining the distance of movement of said driving means, primary and secondary transmitting-gears, means controlled by a totalizer-train of lower order for holding said driving-gears in lock, said means, upon being operated, effecting an advance with respect to one of said driving-gears; substantially as described.

99. In a machine of the character described, the combination with a primary gear 81 in a totalizer-train of higher order, of differential means for driving the same, keys for controlling said differential means, of a secondary gear 97, means for locking said gears together, and means effective upon the operation of the primary gear in the train of lower order for advancing the gear 97 with respect to the gear 81 without unlocking said gears from each other; substantially as described.

100. In a machine of the character described, the combination with a series of totalizer-trains, each including a wide-faced gear 82 with which meshes a gear 97, and a gear 81 whose axis of rotation is coincident with that of independent operable differential driving means for said totalizer-trains, keys for determining the distance of movement of said driving means, the gear 97, of a connection between said gears 81 and 97, whereby, they are constantly locked to each other, means for driving the totalizer-train, said means coöperating primarily with the gear 81, and means operated by a totalizer-train of lower order for advancing the gear 97, while the gear 81 is permitted to remain stationary; substantially as described.

101. In a machine of the character described, the combination with a series of totalizer-trains each consisting of a wide-faced gear 82, a gear 97 in mesh therewith, and a primary gear 81 whose axis of rotation is coincident with that of gear 97, of independently-operable segments designed to mesh with the gears 81 and drive the totalizer-train, keys for controlling the position of said segments, a connection between the gears 81 and 97 of each totalizer-train, and means operated by a train of lower order for coöperating with said connection between the gears 81 and 97 of the train of higher order, whereby the gear 97 is longitudinally displaced and rotatably advanced with respect to the gear 81, irrespective of whether or not the gear 81 is stationary or being rotated to impart motion to the totalizer-train in which it is located, in addition to the motion imparted to said train by the advancement of gear 97; substantially as described.

102. In a machine of the character described, the combination with independently-operable totalizer-trains, of independent operable differential driving means for said totalizer-trains, keys for determining the distance of movement of said driving means, escapement-teeth carried by a wheel of one train, and a pallet-wheel operated by an adjacent train, for coöperating with said escapement-teeth; substantially as described.

103. In a machine of the character described, the combination with a totalizer-train which includes a primary transmitting-gear normally locked to a secondary transmitting-gear so as to move in unison therewith, of independent operable differential driving means for said totalizer-trains, keys for determining the distance of movement of said driving means, and means operated by the next adjacent train of lower order for rotatably advancing the secondary transmitting-gear to drive the train independently of the primary gear; substantially as described.

104. In a machine of the character described, the combination with a totalizer-train comprising a primary transmitting-gear, a secondary transmitting-gear and a driven gear, of independent operable differential driving means for said totalizer-trains, keys for determining the distance of movement of said driving means, means for locking the primary and secondary gears together, and means for moving the secondary gear longitudinally its shaft, said movement effecting a partial rotation thereof independently of the primary gear; substantially as described.

105. In a machine of the character described, the combination with independently-operable totalizer-trains, of independent operable differential driving means for said totalizer-trains, keys for determining the distance of movement of said driving means, escapement-teeth carried by a wheel of one train, yielding crowns for said teeth, and a pallet-wheel operated by an adjacent train for coöperating with said escapement-teeth; substantially as described.

106. In a machine of the character described, the combination with independently-operable totalizer-trains, of independent operable differential driving means for said totalizer-trains, keys for determining the distance of movement of said driving means, escapement-teeth carried by a wheel of one train, said teeth being triangularly shaped, their apices being oppositely disposed, and a pallet-wheel operated by an adjacent train for coöperating with said escapement-teeth; substantially as described.

107. In a machine of the character described, the combination with independently-operable totalizer-trains, of independent operable differential driving means for said totalizer-trains, keys for determining the distance of movement of said driving means, oppositely-disposed triangularly-shaped escapement-teeth carried by a wheel of one train, yielding crowns forming the apices of said teeth, and a pallet-wheel operated by an adjacent train for coöperating with said escapement-teeth; substantially as described.

108. In a machine of the character described, the combination with independently-operable totalizer-trains, of independent operable differential driving means for said totalizer-trains, keys for determining the distance of movement of said driving means, escapement-teeth carried by a wheel of one train, said teeth being formed in part by a yielding portion and a fixed portion, a pallet-wheel carrying teeth which coöperate with said yielding and fixed portions of the teeth, and means operated by an adjacent train for driving said pallet-wheel; substantially as described.

109. In a machine of the character described, the combination with totalizer-trains, of independent operable differential driving means for said totalizer-trains, keys for determining the distance of movement of said driving means, triangularly-shaped escapement-teeth carried by a wheel of one train, a pallet-wheel carrying diamond-shaped pallets for coöperating with said escapement-teeth, and means operated by an adjacent train for operating said pallet-wheel; substantially as described.

110. In a machine of the character described, the combination with totalizer-trains, of independent operable differential driving means for said totalizer-trains, keys for determining the distance of movement of said driving means, laterally-projecting flanges carried by a wheel of one of said trains, triangularly-shaped teeth supported by said flanges, yielding crowns for said teeth, said crowns having inclined faces, a pallet-wheel having pallets for coöperating with said teeth and said yielding portions, and means actuated by an adjacent train for operating said pallet-wheel; substantially as described.

111. In a machine of the character described, the combination with independently-operable totalizer-trains, of independent operable differential driving means for said totalizer-trains, keys for determining the distance of movement of said driving means, triangularly-shaped escapement-teeth carried by a wheel of one train, said teeth being oppositely disposed, and consisting in part of a yielding portion formed with an inclined face, a pallet-wheel having pallets for coöperating with said escapement-teeth, and means actuated by an adjacent train for operating said pallet-wheel; substantially as described.

112. In a machine of the character described, the combination with totalizer-trains, of independent operable differential driving means for said totalizer-trains, keys for determining the distance of movement of said driving means, oppositely-disposed triangularly-shaped escapement-teeth carried by a wheel of one train, said teeth being formed in part by a yielding portion having an inclined face, a pallet-wheel having diamond-shaped escapement-teeth, and means operated by an adjacent train for imparting a reciprocating motion to said pallet wheel; substantially as described.

113. In a machine of the character described, the combination with totalizer-trains, of independent operable differential driving means for said totalizer-trains, keys for determining the distance of movement of said driving means, a train of higher order consisting of a primary driving-gear, a secondary transmitting-gear capable of longitudinal movement on its shaft, and a broad-faced receiving-gear, of a cam operated by the train of lower order, an arm vibrated by said cam and connected to the secondary transmitting-gear, whereby when said arm is vibrated said gear is moved longitudinally its shaft, a pallet-wheel conjoined to said longitudinally-movable gear, and escapement-teeth carried by the primary gear for coöperating with said pallet-wheel; substantially as described.

114. In a machine of the character described, the combination with independently-operable totalizer-trains, of differential means for operating said totalizer-trains, keys for controlling said differential means, item-trains for driving the same, carrying devices coöperating with said totalizer-trains, said carrying devices being in the form of an escapement, and means for locking said totalizer-trains against movement when out of engagement with the item-trains; substantially as described.

115. In a machine of the character described, the combination with totalizer-trains, of differential means for operating said totalizer-trains, keys for controlling said differential means, propelling-escapements interposed between adjacent trains, item-trains, driving mechanism therefor, a keyboard consisting of series of keys, one series being identified with each item-train, a means in a totalizer-train of lower order for operating a propelling-escapement to move the totalizer-train of higher order to effect the carrying during the period that the totalizer-trains are connected to the driving mechanism for the item-trains; substantially as described.

116. In a machine of the character described, the combination with totalizer-trains, of independent operable differential driving means for said totalizer-trains, keys for determining the distance of movement of said driving means, carrying devices for driving the next adjacent train of higher order, and means operated by the actuating-train of lower order for excessively moving said carrying devices to take up lost motion; substantially as described.

117. In a machine of the character described, the combination with totalizer-trains, of independent operable differential driving means for said totalizer-trains, keys for determining the distance of movement of said driving means, carrying devices connecting said trains, said devices being actuated by one train for driving the next adjacent train of higher order, and a cam for operating said carrying devices, said cam having a fluctuation in excess of the required movement to be imparted to the carrying devices; substantially as described.

118. In a machine of the character described, the combination with totalizer-trains, of differential means for operating said totalizer-trains, keys for controlling said differential means, connections therebetween for driving one train from the next adjacent train of lower order, and means for correcting the lost motion resulting from such transmission of motion; substantially as described.

119. In a machine of the character described, the combination with a series of totalizer-trains including cams, of differential means for operating said totalizer-trains, keys for controlling said differential means, means operated by said cams for effecting the carrying from a train of lower order to the next adjacent train of higher order, said cams having an excess throw effecting such lost motion, and means for correcting the abnormal position of said carrying devices; substantially as described.

120. In a machine of the character described, the combination with a series of totalizer-trains in which are included cams, of differential means for operating said totalizer-trains, keys for controlling said differential means, arms which are vibrated by said cams, carrying devices operated by said arms for driving a train of higher order from a train of lower order, said cams imparting to the vibrating arms an excess throw to take up lost motion, and means for correcting the position of said carrying devices; substantially as described.

121. In a machine of the character described, the combination with totalizer-trains under tension contrary to their forward movement, differential means for operating said totalizer-trains, keys for controlling said differential means, and vibratory connections between said trains for driving the next adjacent train of higher order; substantially as described.

122. In a machine of the character described, the combination with a totalizer-train including a cam having a greater operating length than is required to effectually drive the next adjacent train in advance to transmit motion thereto in the act of carrying, of differential means for operating said totalizer-trains, keys for controlling said differential means, and a tension device which operates in opposition to the advance of said cam, for taking up such excess motion; substantially as described.

123. In a machine of the character described, the combination with item-trains which are under tension at all times, of totalizer-trains capable of being connected with the driving mechanism for said item-trains so as to be likewise held under tension, carrying devices in said totalizer-trains for driving the next adjacent train of higher order from a train of lower order, a cam in the train of lower order for excessively driving said carrying devices, and means for restoring the item-trains to home position against said tension, which restoration of the item-trains and its driving mechanism actuates the totalizer-trains, said restoring mechanism moving the item-trains beyond their home position, and consequently the totalizer-trains beyond the limits prescribed by the item-trains, whereby the excess movement of the cams is rendered effective, the tension of the item-trains, when released from the restoring medium, becoming effective to restore said item-trains to home position and correspondingly operate the connected totalizer-trains; substantially as described.

124. In a machine of the character described, the combination with item-trains, of spring-actuated drivers therefor, whereby said item-trains when operated are held under tension, totalizer-trains which are capable of being connected with said spring-actuated drivers, cams in said totalizer-trains, carrying devices which are operated by said cams, and restoring means for the item-trains and their drivers which, when operated, moves the totalizer-trains and the item-trains to abnormal position beyond zero so as to impart an excessive movement to said cams, which excessive movement is corrected by the spring-actuated driver for the item-trains before said drivers are disconnected from the totalizer-trains; substantially as described.

125. In a machine of the character described, the combination with totalizer-trains, of differential means for operating said totalizer-trains, keys for controlling said differential means, the train of higher order having escapement-teeth and a pallet-wheel cooperating therewith, a cam in the train of lower order, an arm engaging said cam and capable of being vibrated thereby to operate the pallet-wheel, means for excessively driving said cam, whereby the pallet-wheel moves beyond the required limits, and means for correcting such excess motion imparted to the pallet-wheel; substantially as described.

126. In a machine of the character described, the combination with totalizer-trains, of differential means for operating said totalizer-trains, keys for controlling said differential means, carrying devices movable beyond the required limits, and means for correcting such excess motion before obtaining a total; substantially as described.

127. In a machine of the character described, the combination with totalizer-trains, of differential means for operating said totalizer-trains, keys for controlling said differential means, carrying devices capable of movement beyond the required limits, and means for restoring such trains as are capable of being effected, to a correct zero position before obtaining a total; substantially as described.

128. In a machine of the character described, the combination with totalizer-trains, of differential means for operating said totalizer-trains, keys for controlling said differential means, carrying devices which are operated by long-stroke cams in said trains, said cams being capable of an excess movement, and truing devices for coöperating with and restoring such cams as may occupy abnormal positions; substantially as described.

129. In a machine of the character described, the combination with totalizer-trains, of differential means for operating said totalizer-trains, keys for controlling said differential means, carrying devices, cams in said trains for operating said carrying devices, said cams being capable of an excess movement, truing devices for correcting such excess movement, and means for determining the zero position of the cams; substantially as described.

130. In a machine of the character described, the combination with a keyboard, of item and totalizer trains, drivers therefor, a total-handle, and means operated by said total-handle for connecting totalizer-trains and drivers, unlocking the totalizer-trains when so engaged, locking the keyboard against manipulation, truing the totalizer-trains, and setting zero-stops in position for the totalizer-trains; substantially as described.

131. In a machine of the character described, the combination with a keyboard, of motor-driven item-trains, totalizer-trains, a total lever or handle, and means operated by said total-handle for locking the trips of the item-trains together, whereby said item-trains may be simultaneously released to effect a reverse rotation in the totalizer-trains; substantially as described.

132. In a machine of the character described, the combination with motor-driven control-bars and their respective item-trains, of latch-plates coöperating with said control-bars, totalizer-trains, a total-lever for connecting the totalizer-trains with the driving mechanism for the item-trains, setting up zero-stops for the item-trains and connecting the latch-plates, and means for operating all of the latch-plates simultaneously to release the control-bars and their connected item-trains, whereby the totalizer-trains are reversely rotated and restored to zero position, placing the total in the item-trains; substantially as described.

133. In a machine of the character described, the combination with a totalizing mechanism in which is included carrying devices, of means in said totalizing mechanism for operating said carrying devices short of a fully-carried position, a total-lever, and means operated by said total-lever for driving the carrying devices to a fully-carried position; substantially as described.

134. In a machine of the character described, the combination with a totalizing mechanism and its self-contained carrying devices, a total-lever, and means operated by said total-lever to cause the carrying devices to move to a fully-carried position before a total is obtained; substantially as described.

135. In a machine of the character described, the combination with a totalizing mechanism, of carrying devices therein which do not stand fully carried, a total-lever, and means operated by said total-lever for compelling the carrying devices to move to a fully-carried position before a total is obtained; substantially as described.

136. In a machine of the character described, the combination with a totalizer-frame, of a total-lever carrying a cam-plate 101, and a cam-lever operated by said cam-plate for actuating said totalizer-frame; substantially as described.

137. In a machine of the character described, the combination with a totalizer-frame having a cam-roller 105, of a total-lever having conjoined thereto a cam-plate 101, a lever 103 coöperating with said cam-plate, and having a cam-face 104 for coöperating with the roller 105; substantially as described.

138. In a machine of the character described, the combination with totalizer-trains, of means for locking the same against movement, a total-lever, a cam-plate conjoined to said lever for effecting an engagement between the totalizer-trains and the item-trains, a link connected to said cam-plate, and a bell-crank lever connected to said link for operating the locking mechanism of the totalizer-trains; substantially as described.

139. In a machine of the character described, the combination with a series of latch-plates, of a rock-shaft provided with means for engaging said latch-plates, a total-lever, and means operated by said total-lever for rocking said shaft into engagement with said latch-plates; substantially as described.

140. In a machine of the character described, the combination with a series of latch-plates, of a rock-shaft provided with means for engaging said latch-plates, a total-lever, a cam-plate operated by said total-lever, a lever 103 operated by said cam-plate, and a link connection between said lever 103 and said rock-shaft; substantially as described.

141. In a machine of the character described, the combination with a total-lever, of a spring-pressed pawl carried thereby, a star-wheel designed to be actuated by said pawl, and truing devices which are operated upon the movement of said star-wheel; substantially as described.

142. In a machine of the character described, the combination with transferring-cams having pins, of star-wheels whose teeth normally lie out of the path of said pins, and means for rotating said star-wheels to operate such cams whose pins are in the path of the teeth of said star-wheels; substantially as described.

143. In a machine of the character described, the combination with carrying-cams having pins, of star-wheels whose teeth normally lie out of the path of said pins, and a total-lever for rotating said star-wheels; substantially as described.

144. In a machine of the character described, the combination with cams having pins, of star-wheels coöperating with said pins, means for locking said star-wheels in normal position whereby the teeth thereof are out of the paths of movement of the pins on the cams, a total-lever, and a spring-pressed pawl carried by said lever for operating the star-wheels in one direction; substantially as described.

145. In a machine of the character described, the combination with a transferring-cam having two pins, a truing device for coöperating with one of said pins, and a zero-stop for coöperating with the other of said pins; substantially as described.

146. In a machine of the character described, the combination with transferring-cam having pins of unequal lengths, of a truing device coöperating with one of said pins, a zero-stop coöperating with the other of said pins, and a total-lever for successively operating said truing device and zero-stop; substantially as described.

147. In a machine of the character described, the combination with transferring-cams having pins traveling in different paths, said pins being of unequal lengths, a zero-stop coöperating with the short pins, a truing device coöperating with the long pins, a spring tending to rotate said cam in one direction, and a total-lever for operating said truing device to rotate said cam against the energy of its spring, said total-lever then placing the zero-stop in position to arrest the spring-impelled cam when released by the truing device; substantially as described.

148. In a machine of the character described, the combination with a series of totalizer-trains, one of the rotary elements of each train of which is provided with a zero-pin, a shaft provided with zero-stops, and means for moving said shaft longitudinally so as to place said zero-stops in the paths of movement of said pins; substantially as described.

149. In a machine of the character described, the combination with a series of totalizer-trains, one of the rotary elements of each train of which is provided with a zero-pin, a shaft provided with zero-stops, and a total-lever for moving said shaft longitudinally so as to place said zero-stops in the paths of movement of said pins; substantially as described.

150. In a machine of the character described, the combination with transferring-cams which are provided with zero-pins, of a longitudinally-movable bar provided with zero-stops, a spring for normally holding said bar so that its zero-stops are out of the paths of movement of said zero-pins, a total-key, and an angled rock-arm operated by said total-key which coöperates with said zero stop-bar to move the same longitudinally to place the zero-stops in the paths of said pins; substantially as described.

151. In a machine of the character described, the combination with motor-driven item-trains, of totalizer-trains designed to be connected with the driving mechanism therefor, and means for increasing the tension of said motors when the totalizer-trains are to be driven; substantially as described.

152. In a machine of the character described, the combination with motor-driven item-trains, of totalizer-trains normally disconnected from the driving mechanism for said item-trains, means for connecting the totalizer-trains with the driving mechanism for the item-trains, whereby, in certain operations, the totalizer and item trains are simultaneously driven, and means for increasing the power of the motors under such conditions; substantially as described.

153. In a machine of the character described, the combination with totalizer and item trains, of springs for driving the item-trains, and means for increasing the tension of said springs when the item and totalizer trains are to be conjointly driven; substantially as described.

154. In a machine of the character described, the combination with spring-driven item-trains, of totalizer-trains, and a total-lever for connecting the totalizer-trains with the driving mechanism for the item-trains, said total-lever placing increased tension in said springs in such operation; substantially as described.

155. In a machine of the character described, the combination with control-bars, of segments driven thereby, item-trains, springs connected to said segments at one end and to a rock-shaft at the opposite end, a total-lever fixed to the end of said rock-shaft, totalizer-trains, means operated by the total-lever for connecting the totalizer-trains with the segments, said total-key, in its operations, rocking its connected shaft and placing increased tension in said springs; substantially as described.

156. In a machine of the character described, the combination with item-trains and their means of operation, of totalizer-trains normally disconnected from the driving mechanism for the said item-trains, a rocking frame in which said totalizer-trains are carried, type-hammers, and means carried by said rocking frame for tripping the type-hammers during the movement of the totalizer-trains into connection with the driving mechanism for the item-trains; substantially as described.

157. In a machine of the character described, the combination with item-trains and their means of operation, said item-trains including printing-wheels, of totalizer-trains normally disconnected from the driving mechanism for the item-trains, a rocking frame in which said totalizer-trains are mounted, type-hammers normally held in a cocked position above the printing-wheels, and means on the rocking totalizer-frame for tripping said type-hammers on the movement of the totalizer-trains into connection with the driving mechanism for the item-trains; substantially as described.

158. In a machine of the character described, the combination with item-trains and their means of operation, said item-trains including type-wheels, of a rocking frame carrying totalizer-trains normally disconnected from the driving mechanism for the item-trains, type-hammers normally held in a cocked position over the printing-wheels, and means for tripping said type-hammers and moving the totalizer-trains into connection with the driving mechanism for the item-trains, said means also restoring the item-trains to zero position, placing the item in the totalizer-trains, and at the same time resetting or recocking the type-hammers; substantially as described.

159. In a machine of the character described, the combination with item-trains and their means of operation, said item-trains including type-wheels, of totalizer-trains normally disconnected from the driving mechanism for the item-trains, means for connecting the totalizer-trains with said driving mechanism, type-hammers whose release is controlled by the position of the totalizer-trains, and means for restoring the item-trains to zero position and resetting the type-hammers; substantially as described.

160. In a machine of the character described, the combination with levers 136 which control type-hammers, of cam-disks coöperating therewith, a ratchet-wheel for driving said cam-disks, and two pawls for alternately coöperating with said ratchet-wheel, one of said pawls partially rotating the same into position to be engaged by the other of said pawls; substantially as described.

161. In a machine of the character described, the combination with levers 136 which control type-hammers, of cam-disks, a ratchet-wheel for driving said cam-disks, a pawl normally in engagement with a tooth of said ratchet-wheel, means for operating said pawl to partially rotate said ratchet-wheel and displace the cam-disks from the paths of the levers 136, and also cause another tooth of said ratchet-wheel to become engaged by a second pawl, and a second pawl for driving said ratchet-wheel to restore succeeding cam-disks in the paths of the levers 131; substantially as described.

162. In a machine of the character described, the combination with item-trains, of printing-wheels operated thereby, a rock-shaft carrying means for locking said item-trains, type-hammers, a lever B for tripping said type-hammers, and a connection between said lever B and said rock-shaft; substantially as described.

163. In a machine of the character described, the combination with item-trains and their printing-wheels, of type-hammers, and a lever B for tripping said type-hammers upon its initial movement, said lever temporarily locking the item-trains against movement during the operation of the type-hammers and subsequently restoring the item-trains and cocking the type-hammers; substantially as described.

164. In a machine of the character described, the combination with wheels in item-trains, which wheels are provided with cam-tracks, of levers 131 coöperating with said cam-tracks, and interlocking means between said levers whereby those at the right are operated independently of the movement of the cam-tracks; substantially as described.

165. In a machine of the character described, the combination with item-wheels carrying cam-tracks, of levers 131 coöperating therewith, type-hammer levers with which said levers 131 are normally engaged, and means carried by said levers to cause the levers to the right of an actuated lever to be operated and become disengaged from the type-hammer levers; substantially as described.

166. In a machine of the character described, the combination with spring-impelled type-hammer levers held in a cocked position by a cam-disk, of levers 131 for restraining the type-hammer levers when the cam-disk is displaced, and means operated by the item-train for releasing the type-hammer levers and permitting them to be tripped by said cam-disks; substantially as described.

167. In a machine of the character described, the combination with spring-impelled type-hammer levers, of a cam-disk for storing power in the springs thereof and holding said levers in a cocked position, levers 131 normally in engagement with said type-hammer levers, item-trains for operating said levers 131 out of engagement with the type-hammer levers, and means for displacing the cam-disks to trip the released type-hammer levers; substantially as described.

168. In a machine of the character described, the combination with spring-impelled type-hammer levers, of cam-disks for storing power in the springs thereof and holding said levers in a cocked position, levers 131 which normally have hooked engagement with said type-hammer levers, item-trains which drive the type-wheels and operate said levers 131, means for causing the levers 131 to the right of an actuated lever to be operated independently of the movement of their associated item-trains, a lever B for restoring the item-trains, and means operated upon the initial movement of said lever B to impart partial rotation to the cam-disks whereby the type-hammer levers are tripped, a continued movement of said lever B driving said cam-disks to store power in the springs connected to the type-hammer levers; substantially as described.

169. In a machine of the character described, the combination with item-trains, of hooked levers 131 operated thereby, type-hammer levers which coöperate with said hooked levers, cam-disks for tripping and resetting the type-hammer levers, means for restoring the item-trains and for effecting the tripping and restoration of said type-hammer levers, and type-hammers yieldingly supported by the type-hammer levers whereby said type-hammers deliver an impacting blow; substantially as described.

170. In a machine of the character described, the combination with a keyboard, of restoring mechanism therefor, a cam operated by said restoring mechanism, and means in the form of a displaceable lever for rendering said cam inoperative; substantially as described.

171. In a machine of the character described, the combination with a keyboard, of a restoring mechanism therefor, a cam operated by said restoring mechanism for placing the keyboard in position after it is restored, and means in the form of a displaceable lever for rendering said cam inoperative until a predetermined number of operations have been given to the keyboard-restoring mechanism; substantially as described.

172. In a machine of the character described, the combination with a keyboard and its restoring mechanism, of a cam operated by said restoring mechanism, a lever coöperating with said cam, and means for displacing said lever with respect to said cam, whereby the restoring mechanism will continue to operate successively; substantially as described.

173. In a machine of the character described, the combination with a keyboard and its restoring mechanism, of means in the form of a cam and a displaceable lever for rendering said restoring mechanism inoperative, and a step-by-step mechanism capable of being manually positioned whereby the lever is operatively engaged with the cam and the restoring mechanism for the keyboard is placed in commission after a predetermined number of steps have resulted; substantially as described.

174. In a machine of the character described, the combination with a keyboard and its restoring mechanism, means in the form of a cam and a displaceable lever for rendering said restoring mechanism inoperative, a ratchet-wheel for controlling the position of the lever in said restoring mechanism, and means coöperating with said ratchet-wheel whereby the lever in the restoring mechanism is rendered operative; substantially as described.

175. In a machine of the character described, the combination with a keyboard and its restoring mechanism, of means for rendering said restoring mechanism inoperative, a handle for actuating the restoring mechanism of the keyboard, a step-by-step mechanism operated by said handle, and means connected to said step-by-step mechanism whereby the keyboard-restoring mechanism is rendered operative; substantially as described.

176. In a machine of the character described, the combination with a keyboard and its restoring devices, of a handle for operating said restoring devices, a step-by-step mechanism normally out of engagement with said restoring devices in the ordinary operation of the machine, and means for rendering the keyboard-restoring devices inoperative and placing said step-by-step mechanism in position to be operated by the handle; substantially as described.

177. In a machine of the character described, the combination with a keyboard and its restoring devices, of a handle for actuating said restoring devices, a rock-arm operated by said handle, a ratchet-wheel normally out of the path of movement of said rock-arm, said ratchet-wheel controlling the operativeness of the restoring devices of the keyboard, and means for locating and holding the ratchet-wheel in a position whereby it will be affected by the said rock-arm, in which position of the ratchet-wheel the keyboard-restoring devices are rendered inoperative; substantially as described.

178. In a machine of the character described, the combination with a keyboard and its restoring devices, of a handle for actuating said restoring devices, means which are effective to lock the keyboard in normal position, which means are normally unaffected by the operation of the handle, said means being capable of becoming affected by the handle whereby the restoring devices are not locked in their normal positions, but are permitted to operate repeatedly upon the successive operations of the handle; substantially as described.

179. In a machine of the character described, the combination with a keyboard and its restoring devices, of a handle for actuating said restoring devices, and a ratchet-wheel capable of being longitudinally displaced whereby, in one position of said ratchet-wheel, the keyboard is locked in its restored position, and the said ratchet-wheel is unaffected by the movement of the handle, and in another position of said ratchet-wheel the keyboard is not locked when restored to normal position and said ratchet-wheel is affected by the operation of the handle; substantially as described.

180. In a machine of the character described, the combination with a keyboard and its restoring devices, of a handle for operating said restoring devices, means for locking the keyboard in normal position after restoration, a longitudinally-movable shaft for rendering said means operative and inoperative at the will of the operator, a ratchet-wheel carried by said shaft, means operated by the handle for advancing said ratchet-wheel step by step at each successive movement of the handle, and means for automatically moving said shaft longitudinally so as to lock the keyboard in normal position and place said ratchet-wheel out of the path of its operating mechanism; substantially as described.

181. In a machine of the character described, the combination with a keyboard, of a repeating mechanism coöperating therewith, whereby, upon the successive operation of a handle, the item set up on the keyboard may be placed in the totalizer a predetermined number of times, said keyboard including control-bars, and means for temporarily supporting the control-bars in normal position at each operation of said handle; substantially as described.

182. In a machine of the character described, the combination with a keyboard embodying control-bars, item and totalizer trains, and a handle for placing the items set up on the keyboard in the totalizer-trains, of repeating devices coöperating with the keyboard, and means operated by said handle for temporarily supporting the control-bars in normal position at each operation of the handle; substantially as described.

183. In a machine of the character described, the combination with a keyboard embodying control-bars, of item-trains, totalizer-trains, a handle for restoring the control-bars and placing the item in the totalizer-train, a repeating mechanism coöperating with said keyboard whereby the control-bars are prevented from being locked in their normal positions, and means operated by the handle for temporarily supporting said control-bars in normal position; substantially as described.

184. In a machine of the character described, the combination with control-bars, of a handle for restoring the same, and means operated by said handle for temporarily supporting said control-bars in normal position; substantially as described.

185. In a machine of the character described, the combination with control-bars, of restoring devices therefor, a handle for operating said restoring devices, zero-posts for supporting the control-bars in normal position, and means operated by said handle for temporarily supporting said control-bars in normal position independently of said zero-posts; substantially as described.

186. In a machine of the character described, the combination with control-bars, of zero-posts for supporting the same in normal position, and a spring-held frame for temporarily supporting said control-bars in normal position independently of the zero-posts; substantially as described.

187. In a machine of the character described, the combination with control-bars, of zero-posts for supporting the same, a restoring mechanism for said control-bars, levers A and B for operating said restoring mechanism and setting the zero-posts in position under the control-bars, and means connected to and operated by the lever B for temporarily supporting the control-bars in normal position independently of the zero-posts; substantially as described.

188. In a machine of the character described, the combination with control-bars, of a rock-shaft carrying a fixed projection, means for operating said shaft, and a yielding frame mounted on said rock-shaft and coöperating with said fixed projection and with said control-bars; substantially as described.

189. In a machine of the character described, the combination with totalizer-trains and their spring-impelled driving means, whereby said totalizer-trains are placed under tension contrary to their forward movement, and means for driving said trains in opposition to said tension to an abnormal position, whereby, when said trains are released they are restored to proper zero position by said tension; substantially as described.

190. In a machine of the character described, the combination with totalizer-trains under tension contrary to their forward movement, means for positively driving said trains in opposition to said tension, said means releasing the trains when in an abnormal position, and zero-stops which are placed in operative position with respect to said trains before they are released, whereby the tension restores the totalizer-trains to correct zero position as determined by said stops; substantially as described.

191. In a machine of the character described, the combination with driving-segments, of means for preventing the overthrow thereof, item and totalizer trains which are capable of being driven by said driving-segments, and means for overthrowing said segments; substantially as described.

192. In a machine of the character described, the combination with driving-segments provided with pins, of collars having recesses normally in register with said pins, item and totalizer trains which are capable of being driven by said driving-segments, and a handle B for rotating the recessed collars and operating said driving-segments, whereby the home position of said driving-segments is determined by the pins carried thereby contacting with the periphery of said collars; substantially as described.

193. In a machine of the character described, the combination with driving-segments, of item and totalizer trains capable of being driven thereby, a lever B for restoring said driving-segments to home position, and a lever C for releasing said driving-segments whereby they may move beyond their home position; substantially as described.

194. In a machine of the character described, the combination with driving-segments, of springs whose energies are exerted to move said segments in one direction, item and totalizer trains which are driven by said driving-segments, a lever for restoring said driving-segments to home position in opposition to said springs, and means for preventing the overthrow of said driving-segments when restored by said lever; substantially as described.

195. In a machine of the character described, the combination with driving-segments, of springs whose energies are exerted to move said driving-segments in one direction, item and totalizer trains which are capable of being driven by said driving-segments, a lever for moving said segments in opposition to their springs and means for permitting said driving-segments to be moved by their connected springs beyond their normal home positions; substantially as described.

196. In a machine of the character described, the combination with driving-segments, of springs whose energies are exerted in moving said segments in one direction, item and totalizer trains which are driven by said driving-segments, a lever for restoring said driving-segments to home position in opposition to their springs, and another lever for releasing said driving-segments whereby they are permitted to be moved beyond their home positions by said springs; substantially as described.

In testimony whereof I hereunto affix my signature, in the presence of two witnesses, this 27th day of March, 1902.

CHARLES STAHLBERG.

Witnesses:
GEORGE BAKEWELL,
G. A. PENNINGTON.